(12) United States Patent
Sagastume et al.

(10) Patent No.: US 12,312,653 B2
(45) Date of Patent: May 27, 2025

(54) SYSTEMS AND METHODS FOR GENERATING LEAD

(71) Applicant: PERSPECTIVE THERAPEUTICS, INC., Seattle, WA (US)

(72) Inventors: Edwin A Sagastume, Iowa City, IA (US); Michael K. Schultz, Hills, IA (US); Daniel McAlister, Downers Grove, IL (US); Andrew W. Knight, Albuquerque, NM (US); Madeleine Eddy, Lisle, IL (US)

(73) Assignee: PERSPECTIVE THERAPEUTICS, INC., Seattle, WA (US)

( * ) Notice: Subject to any disclaimer, the term of this patent is extended or adjusted under 35 U.S.C. 154(b) by 0 days.

(21) Appl. No.: 18/806,298

(22) Filed: Aug. 15, 2024

(65) Prior Publication Data

US 2025/0059621 A1     Feb. 20, 2025

Related U.S. Application Data

(60) Provisional application No. 63/519,817, filed on Aug. 15, 2023.

(51) Int. Cl.
    *C22B 3/00*             (2006.01)
    *B01D 15/18*           (2006.01)
    (Continued)

(52) U.S. Cl.
CPC .......... *C22B 13/04* (2013.01); *B01D 15/1814* (2013.01); *B01D 15/362* (2013.01);
(Continued)

(58) Field of Classification Search
None
See application file for complete search history.

(56) References Cited

U.S. PATENT DOCUMENTS

| 6,126,909 A | 10/2000 | Rotmensch et al. |
| 2018/0137947 A1 | 5/2018 | Pipes et al. |

(Continued)

FOREIGN PATENT DOCUMENTS

| WO | 2021110950 A1 | 6/2021 |
| WO | 2022175750 A1 | 8/2022 |

(Continued)

OTHER PUBLICATIONS

Saini et al. Optimized Methods for the Production of High-Purity 203Pb Using Electroplated Thallium Targets J. Nucl. Med., 64:1791-1797 2023.

(Continued)

*Primary Examiner* — Kara M Peo
(74) *Attorney, Agent, or Firm* — Bryan Cave Leighton Paisner LLP

(57) ABSTRACT

A method for separating a lead radioisotope from a mixture comprising the lead radioisotope and a radioisotope of radium or thorium is provided, along with a system comprising a plurality of chromatographic columns. The system can include a first cartridge having a lead-complexing media that preferentially binds the lead radioisotope over radioisotopes of radium or thorium, and a second cartridge having a weak cationic exchange media, where a pH of a loading solution used to load the second cartridge is $pH^{2L}$, and a pH of an eluent used to elute the lead radioisotope from the second cartridge is $pH^{2E}$, and $pH^{2L}$ is greater than $pH^{2E}$. The system can also comprise further third and fourth cartridges with chromatographic media to extract and purify the lead radioisotope, to provide a purified solution of lead radioisotope that can be used for medical and other purposes, such as in the labeling of radiopharmaceutical compounds.

25 Claims, 8 Drawing Sheets

(51) Int. Cl.
  *B01D 15/36*   (2006.01)
  *B01D 15/42*   (2006.01)
  *C22B 3/02*    (2006.01)
  *C22B 3/42*    (2006.01)

(52) U.S. Cl.
  CPC .............. *B01D 15/426* (2013.01); *C22B 3/02* (2013.01); *C22B 3/42* (2013.01)

(56) References Cited

U.S. PATENT DOCUMENTS

| | | |
|---|---|---|
| 2021/0024365 A1 | 1/2021 | O'Hara |
| 2022/0013246 A1 | 1/2022 | Torgue et al. |
| 2022/0037046 A1 | 2/2022 | Dureau et al. |

FOREIGN PATENT DOCUMENTS

| | | |
|---|---|---|
| WO | 2023023731 A1 | 3/2023 |
| WO | 2024050168 A2 | 3/2024 |

OTHER PUBLICATIONS

Horwitz et al., A lead-selective extraction chromatographic resin and its application to the isolation of lead from geological samples, Analytica Chimica Acta 292: 263-273 1994.

Horwitz et al. A novel strontium-selective extraction chromatographic resin, Solvent Extraction and Ion Exchange, 10 (2): 29 pages 1992.

McAlister et al., Chromatographic generator systems for the actinides and natural decay series elements, Radiochim. Acta, 99: 151-159 2011.

McNeil et al. Optimized production, purification, and radiolabeling of the 203 Pb/212 Pb theranostic pair for nuclear medicine, Scientific Reports, 13:10623 2023.

Van der Walt et al. Separation of 203Pb by Ion-Exchange Chromatography on Chelex 100 After Production of 203Pb by the Pb(p, xn)203Bi-EC'B+ 203Pb Nuclear Reaction, Tahnta, vol. 36, No. 4, pp. 451-455, 1989.

International Search Report and Written Opinion for PCT/US24/42524 dated Nov. 18, 2024.

International Search Report and Written Opinion for PCT/US23/69474 dated Feb. 15, 2024.

Tosato et al. "Alpha Atlas: Mapping global production of a-emitting radionuclides for targeted alpha therapy," Nuclear Medicine and Biology 142-143 (2025) 108990.

Gape et al. "Towards Effective Targeted Alpha Therapy for Neuroendocrine Tumours: A Review," Pharmaceuticals 2024, 17, 334. https://doi.org/10.3390/ph17030334.

McAlister et al. "Extraction of Selected Metal Ions by Mixtures of Diglycolamides and Crown Ethers," Solv. Extr. Ion Exch., 39(2), 184-203 (2021).

SYSTEMS AND METHODS FOR GENERATING LEAD

CROSS REFERENCE TO RELATED APPLICATIONS

This application claims priority of U.S. Provisional Application No. 63/519,817, filed Aug. 15, 2023, the entire contents of which are hereby incorporated by reference herein in its entirety.

STATEMENT AS TO FEDERALLY SPONSORED RESEARCH

The work disclosed herein was made, in part, with government support under grant numbers R44CA250872 and R44CA254613 awarded by the NIH SBIR program. The government has certain rights in the invention.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure relates generally to the field of nuclear medicine and more particularly to systems and methods for obtaining and separating radionuclides (radioactive atoms) and radioactive materials for use in nuclear medicine, molecular imaging, therapeutics, and radiopharmaceuticals.

BACKGROUND

Nuclear medicine uses radioactive atoms, referred to as radionuclides or isotopes or radioisotopes, for diagnosis and treatment. Radionuclides used for these purposes can be attached to ligands (e.g., peptides, antibodies, small molecules), and the ligands can direct the radionuclides specifically to targeted tissues or cells. Isotopes of lead (Pb), including lead-212 (Pb-212) and lead-203 (Pb-203), have emerged as an effective radionuclide pair for targeted radioligand therapy and imaging, respectively.

Commercialization of Pb-212 and Pb-203 based drug products require manufacturing of large quantities of these radionuclides, which represents many challenges including but not limited to chemical separations, radiolytic damage of materials, radiation safety issues, and transportation etc. Pb-212 is a product in the natural thorium-232 (Th-232) decay. Because Th-232 has a very long half-life ($t_{1/2}$=1.4× $10^{10}$ years), the amount of Th-232 required to produce quantities of Pb-212 relevant for medical uses (i.e. mCi to Ci amounts) is on the order of tons of Th-232. Therefore, other methods to produce Pb-212 via shorter lived parent is more desirable. Radium (Ra) isotope with a convenient half-life (Ra-224, $t_{1/2}$=3.63 days) can be used as a useful intermediate for obtaining Pb-212, but can be strongly radiolytic and thus can be difficult to store and handle. Therefore, to develop a large-scale supply of Pb-212, new methods and systems are needed that can overcome the impacts of radiolysis and facilitate commercial-scale production.

SUMMARY OF THE DISCLOSURE

Various embodiments of this disclosure relate to systems and methods for isolating, purifying, and producing lead radioisotopes from radioisotopes of radium.

In one aspect, embodiments of the present disclosure relate to a method for separating a lead radioisotope from a mixture comprising the lead radioisotope and a radioisotope of radium or thorium, the method comprising: (a) loading a first cartridge with a first loading solution comprising the mixture, the first cartridge containing a first chromatographic media comprising lead-complexing media that preferentially binds the lead radioisotope over radioisotopes of radium and thorium in the presence of the first loading solution, whereby the lead radioisotope is bound to the lead-complexing media and is separated from the first loading solution; (b) eluting the bound lead radioisotope from the first cartridge with a first eluent, to form a first eluate comprising the lead radioisotope dissolved in the first eluate; (c) loading a second cartridge with a second loading solution comprising the first eluate, the second cartridge having a second chromatographic media comprising a weak cationic exchange media that preferentially binds the lead radioisotope over radioisotopes of radium and thorium in the presence of the second loading solution, whereby the lead radioisotope is bound to the weak cationic exchange media and separated from the second loading solution, and (d) eluting the lead radioisotope from the second cartridge with a second eluent to form a second eluate comprising the lead radioisotope dissolved in the second eluate, wherein the second loading solution has a pH, $pH^{2L}$, the second eluent has a pH, $pH^{2E}$, and $pH^{2L}$ is greater than $pH^{2E}$.

In another aspect, embodiments of the present disclosure relate to a system for separating a lead radioisotope from a mixture comprising lead radioisotope and a radium isotope or a thorium isotope, the system comprising a first and a second cartridge in series with one another, each of the first and second cartridges having an inlet, an outlet and a chamber therebetween containing chromatographic media, wherein (a) the first cartridge chamber contains a first chromatographic media comprising lead-complexing media that (i) preferentially binds the lead radioisotope over radioisotopes of radium and thorium in the presence of a first loading solution containing the mixture, thereby separating the lead radioisotope from the first loading solution, and (ii) elutes the lead radioisotope in the presence of a first eluent to form a first eluate comprising the lead radioisotope dissolved in the second solution; and (b) the second cartridge chamber contains a second chromatographic media comprising a weak cationic exchange media that (i) preferentially binds the lead radioisotope over radioisotopes of radium and thorium from a second loading solution comprising the first eluate, thereby separating the lead radioisotope from the second loading solution, and (ii) elutes the lead radioisotope in the presence of a second eluent to form a second eluate comprising the lead radioisotope dissolved in the second eluate, wherein the second loading solution has a pH, $pH^{2L}$, the second eluent has a pH, $pH^{2E}$, and $pH^{2L}$ is greater than $pH^{2E}$.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which.

DETAIL DESCRIPTION

Figure 1:
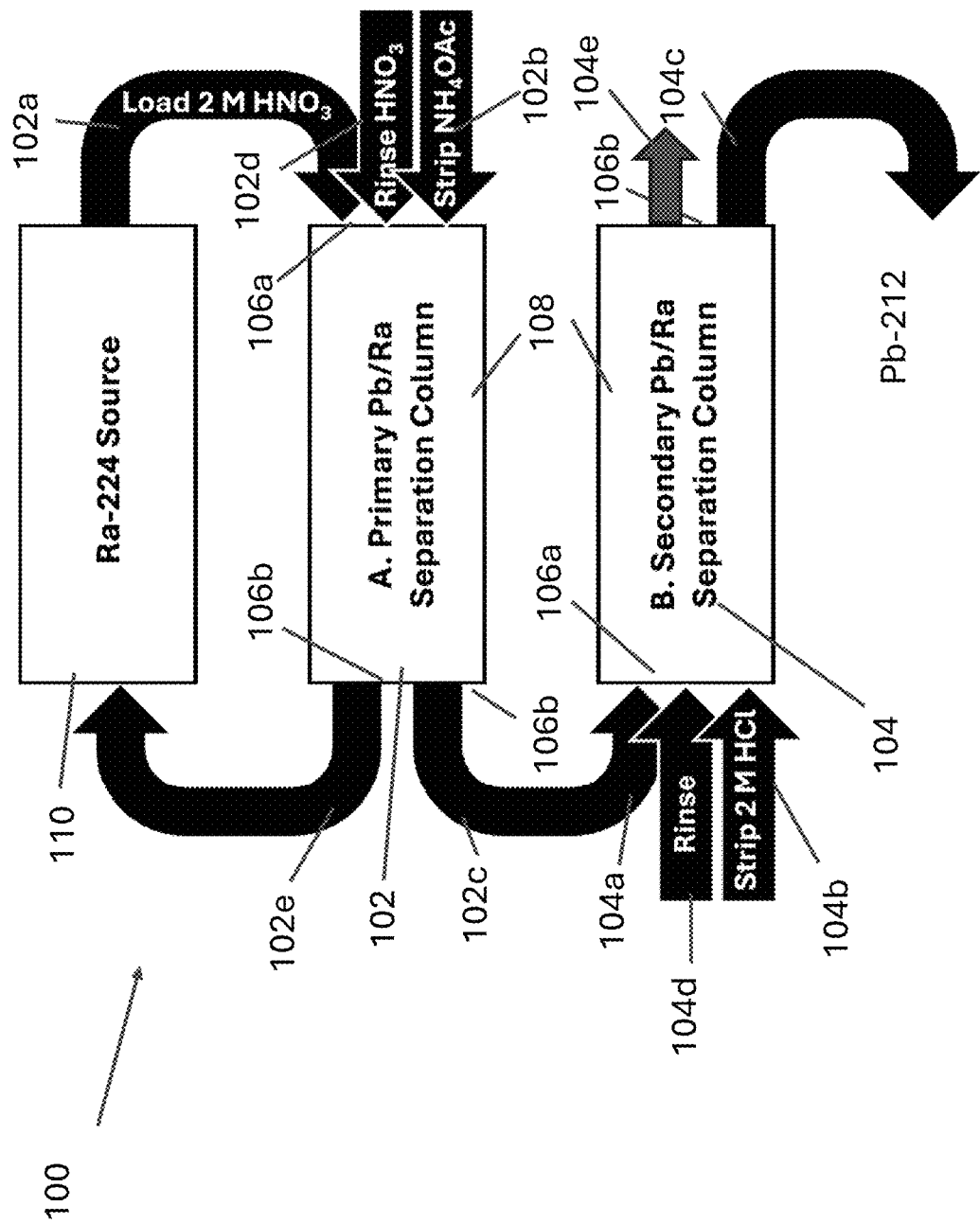
FIG. 1 is a flowchart illustrating steps for separating a lead radioisotope (e.g. Pb-212) from a mixture comprising the lead radioisotope and a radioisotope of radium (e.g. Ra-224) or thorium (e.g. Th-228) using up to two sequential cartridges for separation, according to one embodiment.

As used herein, the terms "comprising", "having", "including", and "containing" and grammatical variations thereof, are inclusive or open-ended and do not exclude additional, unrecited elements and/or method steps, even if a feature/component defined as a part thereof consists or consists essentially of specified feature(s)/component(s). The term "consisting essentially of" if used herein in connection with a compound, composition, use or method, denotes that additional elements and/or method steps may be present, but that these additions do not materially affect the manner in which the recited compound, composition, method or use functions. The term "consisting of" if used herein in connection with a feature of a compound, composition, use or method, excludes the presence of additional elements and/or method steps in that feature. A compound, composition, use or method described herein as comprising certain elements and/or steps may also, in certain embodiments consist essentially of those elements and/or steps, and in other embodiments consist of those elements and/or steps, whether or not these embodiments are specifically referred to. A use or method described herein as comprising certain elements and/or steps may also, in certain embodiments consist essentially of those elements and/or steps, and in other embodiments consist of those elements and/or steps, whether or not these embodiments are specifically referred to.

A reference to an element by the indefinite article "a" does not exclude the possibility that more than one of the elements is present, unless the context clearly requires that there be one and only one of the elements. The singular forms "a", "an", and "the" include plural referents unless the context clearly dictates otherwise. The use of the word "a" or "an" when used herein in conjunction with the term "comprising" may mean "one", but it is also consistent with the meaning of "one or more", "at least one" and "one or more than one".

In this disclosure, the recitation of numerical ranges by endpoints includes all numbers subsumed within that range including all whole numbers, all integers and, where suitable, all fractional intermediates (e.g., 1 to 5 may include 1, 1.5, 2, 2.75, 3, 3.80, 4, and 5 etc.).

Unless otherwise specified, "certain embodiments", "various embodiments", "an embodiment" and similar terms includes the particular feature(s) described for that embodiment either alone or in combination with any other embodiment or embodiments described herein, whether or not the other embodiments are directly or indirectly referenced and regardless of whether the feature or embodiment is described in the context of a method, product, use, composition, compound, et cetera.

As used herein, the terms "treat", "treatment", "therapeutic" and the like include ameliorating symptoms, reducing disease progression, improving prognosis and reducing recurrence.

As used herein, the term "diagnostic agent" includes an "imaging agent". As such, a "diagnostic radionuclide" includes radionuclides that are suitable for use in imaging agents.

The term "subject" refers to an animal (e.g. a mammal or a non-mammal animal). The subject may be a human or a non-human primate. The subject may be a laboratory mammal (e.g., mouse, rat, rabbit, hamster and the like). The subject may be an agricultural animal (e.g., equine, ovine, bovine, porcine, camelid and the like) or a domestic animal (e.g., canine, feline and the like). In some embodiments, the subject is a human.

As used herein, the terms "salt" and "solvate" have their usual meaning in chemistry. As such, when the compound is a salt or solvate, it is associated with a suitable counter-ion. It is well known in the art how to prepare salts or to exchange counter-ions. Generally, such salts can be prepared by reacting free acid forms of these compounds with a stoichiometric amount of a suitable base (e.g. without limitation, Na, Ca, Mg, or K hydroxide, carbonate, bicarbonate, or the like), or by reacting free base forms of these compounds with a stoichiometric amount of a suitable acid. Such reactions are generally carried out in water or in an organic solvent, or in a mixture of the two. Counter-ions may be changed, for example, by ion-exchange techniques such as ion-exchange chromatography. All zwitterions, salts, solvates and counter-ions are intended, unless a particular form is specifically indicated.

In certain embodiments, the salt or counter-ion may be pharmaceutically acceptable, for administration to a subject. As used herein, "pharmaceutically acceptable" means suitable for in vivo use in a subject, and is not necessarily restricted to therapeutic use, but also includes diagnostic use. More generally, with respect to any pharmaceutical composition disclosed herein, non-limiting examples of suitable excipients include any suitable buffers, stabilizing agents, salts, antioxidants, complexing agents, tonicity agents, cryoprotectants, lyoprotectants, suspending agents, emulsifying agents, antimicrobial agents, preservatives, chelating agents, binding agents, surfactants, wetting agents, non-aqueous vehicles such as fixed oils, or polymers for sustained or controlled release. See, for example, Berge et al. 1977. (J. Pharm Sci. 66:1-19), or Remington—The Science and Practice of Pharmacy, 21st edition (Gennaro et al editors. Lippincott Williams & Wilkins Philadelphia), each of which is incorporated by reference in its entirety.

As used herein, the term "alkyl group" encompasses saturated linear or branched carbon radicals having, for example, one to about twenty carbon atoms or, in specific embodiments, one to about twelve carbon atoms. In other embodiments, alkyl groups are "lower alkyl" groups having one to about six carbon atoms. Examples of such groups include, but are not limited thereto, methyl, ethyl, n-propyl, isopropyl, n-butyl, isobutyl, sec-butyl, tert-butyl, pentyl, iso-amyl, hexyl, ethylhexyl, octyl and the like.

As used herein, the term "eluent" encompasses solutions used to remove materials (e.g. lead or lead radioisotopes) that are absorbed and/or bound to a chromatographic media. In certain embodiments, the eluent displaces (e.g. via ion exchange) or otherwise disrupts bonds between a material (e.g. lead or lead radioisotopes) and the chromatographic media (e.g., the stationary phase), such that the material travels with the eluent (e.g. the mobile phase) out of a cartridge or column containing the chromatographic media. According to certain embodiments, the eluent can include, for example, a solution comprising a weak acid and/or a mineral acid.

As used herein, the term "eluate" encompasses the mobile phase that passes out of a column or cartridge containing chromatographic media, such as upon elution thereof with an eluent introduced into the column or cartridge. In certain embodiments, the eluate will contain materials (e.g. lead or lead radioisotopes) that were absorbed and/or bound to the chromatographic media, and that are dissolved in the solution used to elute the materials from the column or cartridge.

As used herein, the term "system" refers to the entirety of the physical components of the present invention required to isolate, purify, and produce lead. The system includes, e.g., vessels, reagents, resin materials, cartridges, tubing, pumps, and automated systems.

As used herein, lead (Pb) refers to the lead element and includes isotopes of both radioactive and observationally stable. The isotopes of Pb include, but are not limited to, Pb-196, Pb-197, Pb-198, Pb-199, Pb-200, Pb-201, Pb-202, Pb-203, Pb-204, Pb-205, Pb-206, Pb-207, Pb-208, Pb-209, Pb-210, Pb-211, Pb-212, Pb-213, Pb-214, Pb-215, and Pb-216.

As used herein, radium (Ra) refers to the radium element and includes isotopes of Ra. These isotopes include but are not limited to, Ra-223, Ra-224, Ra-225, Ra-226, Ra-227, Ra-228, Ra-229, and Ra-230.

As used herein, thorium (Th) to the thorium element and includes isotopes of Th. These isotopes include but are not limited to, Th-228, Th-232, Th-230, Th-227, Th-229, Th-231, Th-233 and Th-234.

As used herein, the term "cartridge" refers to a pre-assembled vessel containing a resin used for the separation and extraction process that acts as a reaction vessel for solutions and eluents to interact with the resin and analytes. The term "cartridge" and "column" are interchangeable.

As used herein, the term "adsorbed on to", "adsorbed onto", and "adsorbed to" are interchangeable, and all of them refer to that an element is adsorbed to resin of a cartridge.

As used herein, the term "chromatographic media" refers to solid material packed, such as a resin or matrix, in a cartridge that contains chemical reagents and extractants designed to extract or separation specific elements under different liquid conditions via a wide range of chemical mechanisms. Herein a chromatographic media includes but is not limited to extraction chromatographic resins, ion exchange resins, and other media used for chemical separations.

As used herein, the term "lead-complexing media" encompasses media, such as a resin or matrix, that has an affinity for lead, and preferentially binds to lead over other certain other chemical species, such as radium and/or thorium. According to certain embodiments, the lead-complexing media may comprise binding moieties capable of binding with lead by forming a chemical complex with lead, as opposed to by an ion exchange interaction based on ionic charge of the lead. For example, the lead-complexing media may comprise binding moieties that are uncharged/ionically neutral media in aqueous solution. According to one embodiment, the lead-complexing media can comprise crown ether-complexing moieties include 4,4'(5')-di-t-butyl-cyclohexano 18-crown-6 diluted in isodecanol (also termed as "Pb Resin" herein), and 4,4'(5')-di-t-butylcyclohexano 18-crown-6 diluted in 1-octanol (also termed as "Sr Resin" herein).

As used herein, the term "weak cationic exchange media" encompasses media, such as a resin or matrix, that preferentially binds to species via weak acid groups based on affinity for cationic forms of the species of interest. According to certain embodiments, the weak cationic exchange media comprises weak acid binding moieties that interact with cationic species via ionic interactions to bind the cationic species thereto. For example, the weak cationic exchange media have weak acid binding moieties such as a carboxylic acid and/or carboxylate group, which are negatively charged at a higher pH (which can be an acidic pH), and neutral at lower pH, and other weak acid groups may also be suitable. According to certain embodiments, the weak cationic exchange media can comprise carboxylalkyl groups bound to a silica support, such as carboxymethyl or carboxyethyl groups, including, for example, e.g. CM-silica, BioSuite CM, and Sep-Pak Accell.

As used herein, the term "strong cationic exchange media" encompasses media, such as a resin or matrix, that preferentially binds to species vis strong acid groups based on affinity for cationic forms of the species of interest. According to certain embodiments, the strong cationic exchange media comprises strong acid binding moieties that interact with cationic species via ionic interactions to bind the cationic species thereto. For example, the strong cationic exchange media comprises strong acid binding moieties such as sulfonic acid and/or sulfonate groups, that are ionized over a wide pH range (and so bind cations across a wide pH spectra). According to certain embodiments, the strong cationic exchange media can comprise sulfonic acid functional groups attached to a support, such as a divinyl-benzene copolymer lattice, including, for example MP-50 and AG-50Wx8.

As used herein, the term "generator" refers to a system for generating a radionuclide. A generator is usually based on a parent-daughter nuclidic pair wherein a relatively long-lived parent isotope (e.g., Ra-224) decays to a relatively short-lived daughter isotope (e.g., Pb-212) suitable for use for a given application (e.g., nuclear medicine).

As used herein, a vessel refers to a physical container that holds materials in liquid, semi-solid, or solid form. The term "vessel" and "container" are interchangeable.

Chromatographic Media and Cartridges

A variety of chromatographic media can be used for cartridges in the present disclosure. According to certain embodiments, the media can comprise a stationary phase material, such as a solid resin or other matrix material, which is functionalized or otherwise provided with chemical moieties that are capable of interacting with and preferentially binding certain materials, such as lead. For example, the chromatographic media may be media having an affinity for certain chemical species (e.g. lead), such that when a solution containing the chemical species is introduced to a cartridge containing the media, the media binds (absorbs) and retains the species, thereby separating the species from other species in the solution for which the media does not have an affinity, and so that pass through the media without binding. The species bound to the media may then be eluted or released from the media on the cartridge by introducing an eluent to the media comprising a chemical composition that separates the chemical species from the media. According to certain embodiments, the chromatographic media comprises any of an inert, inorganic (such as silica or alumina particles or a silica gel), organic (such as a polymer) or inorganic-organic solid support, which is functionalized, such as by grafting or impregnation, with organic molecules which retain the chemical species of interest (e.g. lead ions ($Pb^{2+}$)) by ion exchange, extraction, molecular recognition or any other mechanism.

According to one embodiment, the media comprises lead-complexing media that has an affinity for lead, and preferentially binds to lead over other certain other chemical species, such as radium and/or thorium. According to certain embodiments, the lead-complexing media may comprise binding moieties capable of binding with lead by forming a chemical complex with lead, as opposed to by an ion exchange interaction based on ionic charge of the lead. For example, the lead-complexing media may comprise binding moieties that are uncharged/ionically neutral media in aqueous solution. According to one embodiment, the lead-complexing media can comprise binding moieties corresponding to any one or more of a diglycolamide-complexing moiety and a crown ether-complexing moiety. For example, according to certain embodiments, the lead-complexing media can comprise a solid support impregnated with a solution comprising a crown-ether-complexing moieties as an extractant and, in particular, a dicyclohexano-8-crown-6 or a dibenzo-18-crown-6 wherein the cyclo-hexyl or benzyl groups are substituted by one or more straight-chain or branched $C_1$ to $C_{12}$ alkyl groups, in an organic diluent non-miscible with water, typically a long-chain hydrocarbon alcohol, e.g. $C_8$ or more. Non-limiting examples of lead-complexing media having crown ether-complexing moieties include 4,4'(5')-di-t-butylcyclohexano 18-crown-6 diluted in isodecanol (also termed as "Pb Resin" herein), and 4,4'(5')-di-t-butylcyclohexano 18-crown-6 diluted in 1-octanol (also termed as "Sr Resin" herein). According to certain embodiments, the lead-complexing media used herein can be 40% (w:w) crown ether or <40% (w:w) crown ether, such as Sr resin or Pb resin (Eichrom; Lisle, IL, USA). In some embodiments, crown ether is 18-crown-6 ether and a resin can be 40% (w:w) 18-crown-6 or <40% (w:w) 18-crown-6. The general formula for this crown ether compound is shown in Formula (1) below, where the compound can be present as a mixture of isomers.

Formula (1)

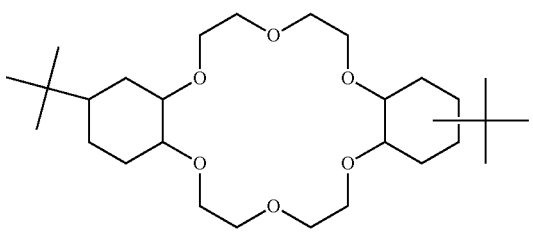

As another example, the lead-complexing media can comprise N,N,N',N'-tetra-alkyldiglycolamides (DGAs) having a chemical formula according to Formula (2) below, where the R groups can independently be the same or different and are branched or linear alkyl groups having 2-12 carbon atoms, such as 5-10 carbon atoms.

Formula (2)

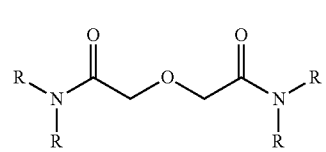

For example, according to certain embodiments, the lead complexing media can comprise any one or more of N,N,N',N' tetra-n-octyldiglycolamide and N,N,N,',N'-tetra-2-ethylhexyldiglycolamide.

According to one embodiment, the media comprises weak cationic exchange media that preferentially binds to species based on affinity for cationic forms of the species of interest. According to certain aspects the weak cationic exchange media comprises binding moieties that interact with cationic species via ionic interactions to bind the cationic species thereto. For example, the weak cationic exchange media have binding moieties that correspond to a weak acid, such as a carboxylic acid and/or carboxylate group, which are negatively charged at a higher pH (which can still be an acidic pH), and neutral at lower pH, and other weak acid groups may also be suitable. According to certain embodiments, the weak cationic exchange media can comprise carboxylalkyl groups bound to a silica support, such as carboxymethyl or carboxyethyl groups. A non-limiting list of such weak cationic exchange media includes, for example, e.g. CM-silica, BioSuite CM, and Sep-Pak Accell.

According to one embodiment, the media comprises strong cationic exchange media that, like weak cationic exchange media, preferentially binds to species based on affinity for cationic forms of the species of interest. According to certain aspects the strong cationic exchange media comprises binding moieties that interact with cationic species via ionic interactions to bind the cationic species thereto. Unlike the weak cationic exchange media, the strong cationic exchange media comprises binding moieties corresponding to a strong acid, such as for example sulfonic acid and/or sulfonate groups, that are ionized over a wide pH range (and so bind cations across a wide pH spectra). According to certain embodiments, the strong cationic exchange media can comprise sulfonic acid functional groups attached to a support, such as a divinylbenzene copolymer lattice. A non-limiting list of such strong cationic exchange media includes, for example MP-50 and AG-50Wx8. Table 1 shows a non-limiting list of resins that can be used in the present disclosure.

TABLE 1

| | | Chromatographic Media | |
|---|---|---|---|
| Cartridge | Media | Chemical Information | Chemical Structure |
| 1-Pb-Complexing Media | Pb Resin | 4,4'(5')-di-t-butylcyclohexano 18-crown-6 (diluent: isodecanol) | |
| | Sr Resin | 4,4'(5')-di-t-butylcyclohexano 18-crown-6 (diluent: 1-octanol) | |
| | DGA | N,N,N',N' tetra-alkyldiglycoamide (alkyl = linear or branched alkyl group having 2 – 12 carbon atoms) | |
| 2-Weak Cation Exchange Media | CM-Silica | Carboxymethyl functional groups bound to a silica-based support | |
| | BioSuite CM | Carboxymethyl functional groups bound to a silica-based support | |
| | Sep-Pak Accell Plus CM | Carboxymethyl functional groups bound to a silica-based support | |
| 3-Strong Cation Exchange Media | MP-50 | Sulfonic acid groups bound to divinyl benzene | |
| | AG-50Wx8 | Sulfonic acid groups bound to divinyl benzene | |

TABLE 1-continued

Chromatographic Media

| Cartridge | Media | Chemical Information | Chemical Structure |
|---|---|---|---|
| 4-Pb-Complexing Media | Pb Resin | 4,4'(5')-di-t-butylcyclohexano 18-crown-6 (diluent: isodecanol) | |
| | Sr Resin | 4,4'(5')-di-t-butylcyclohexano 18-crown-6 (diluent: 1-octanol) | |
| | DGA | N,N,N',N' tetra-alkyldiglycoamide (alkyl = linear or branched alkyl group having 2 – 12 carbon atoms) | |

The media used herein may be any particle size effective for separation, such as from 20 μm-50 μm, 50 μm-100 μm, or 100 μm-150 μm. In one embodiment, the particle size of media used in cartridges disclosed herein are 50 μm-100 μm. In one embodiment, the media used in cartridges disclosed herein can adsorb (trap) at least 8000, at least 85%, at least 90%, at least 95%, at least 99.00%, at least 99.50%, at least 99.99%, at least 99.999% or at least 99.9999% of its designated radionuclide (e.g., radium-224 or lead-212). According to certain aspects, the use of multiple (e.g., 2, 3, 4, or 5) cartridges in series, with select media with specific binding/extraction characteristics, provides advantages in terms of greater removal of unwanted elements than use of only a single type of separation media in a single cartridge. According to certain embodiments, the use of the cartridges disclosed herein may lead to less than 0.01%, less than 0.001%, less than 0.0001%, or less than 0.00001% breakthrough of unwanted nuclides (e.g., radium-224).

According to certain embodiments, multiple, distinct cartridges, such as cartridges having different chromatographic media contained therein may be configured to be reversibly separable and joinable. For example, the cartridges may be connected together by a conduit and connection between cartridges, such as male-female luer-lock, luer slip, etc. A luer-lock or luer-slip opening (inner diameter) between the cartridges may be about 1 mm-10 mm in diameter (such as less than 2 mm, less than 3 mm, less than 4 mm, less than 5 mm, less than 6 mm, less than 7 mm, less than 8 mm, less than 9 mm, or equal to or less than 10 mm) and may have a diameter ½, ⅓, ¼, ⅕ as large as a cartridge diameter. According to certain embodiments, certain cartridges joined in series may be connected together such that eluate from a first cartridge in the series flows to a subsequent cartridge in the series. The cartridges may also be separated to allow for disposal or recycling of an initial solution from a first cartridge, prior to elution from the first cartridge of an eluate that is intended for loading onto a second cartridge. For example, for a first cartridge having a media that preferentially binds lead, the first cartridge may be arranged with respect to a second cartridge such that a solution used to load a lead-containing mixture onto the first cartridge passes through the first cartridge and is collected for disposal or recycling, without being flowed to the second cartridge. Any subsequent washings of the first cartridge may be similarly recycled or disposed of, without being passed to the second cartridge. In other words, the first and second cartridge may not be fluidly connected during the loading and/or rinsing stages. According to further embodiments, in order to pass eluate containing lead to a second cartridge, the first cartridge may be fluidly connected to the second cartridge to flow the eluate to the second cartridge, such as for example when eluent is provided to the first cartridge to elute lead bound to the media in the first cartridge. For example, the second cartridge may be placed directly below the first cartridge and connected thereto (e.g. via a conduit) such that an eluate that flows from the first cartridge flows directly into the second cartridge. Second, third and fourth cartridges may similarly be connected to one another in series, such that unwanted loading solutions and/or rinsing solutions can be recycled or disposed of without passing to subsequent cartridges in the series, but the cartridges can be fluidly connected to one another in a case where it is intended that an eluate from a cartridge be passed to another in the series. For example, a third cartridge may be placed directly below the second cartridge and connected thereto (e.g. via a conduit) such that an eluate that flows from the second cartridge flows directly into the third cartridge. As another example, a fourth cartridge may be placed directly below the third cartridge and connected thereto (e.g. via a conduit) such that a solution that flows from the third cartridge flows directly into the fourth cartridge. Further explanation of embodiments of the disclosure are provided below.

System and Method for Chromatographic Separation and Collection of Lead from Radium Described herein is a separation process and system developed for facilitating lead extraction from a liquid source of radium and/or thorium, and specifically with respect to the extraction of lead radioisotopes from a radioisotopic source of radium and/or thorium. According to certain embodiments, this process and system can be used for production of highly purified lead in large quantities. According to further embodiments, the process and system can be used for the separation and collection of lead radioisotopes without the need to store highly radiolytic radium radioisotopes on a storage column or cartridge. According to further embodiments, the separation process and system can streamline the production of lead-based products for nuclear medicine, such as radiopharmaceuticals, enabling a steady supply of nuclear medicine doses that can meet commercial demand for patients.

Referring to FIG. 1, according to one embodiment, a system 100 is provided that for separating a lead radioisotope from a mixture 110 (Ra-224 Source in FIG. 1) comprising lead radioisotope and a radium isotope or a thorium isotope. The system 100 comprises a first cartridge (Primary Pb/Ra Separation Column in FIG. 1) 102 and a second cartridge (Secondary Pb/Ra Separation Column in FIG. 1) 104 in series with one another, each of the first and second cartridges having their own separate inlet 106a, an outlet 106b, and each cartridge containing its own separate chamber 108 between the inlet and outlet for that cartridge, containing chromatographic media. According to embodiments herein, loading solutions, rinsing solutions, eluents etc. are introduced to each cartridge at the cartridge inlet, and pass through the chamber to the cartridge outlet, where eluate and spent solutions leave the cartridge. While FIG. 1 depicts the specific radioisotopes Pb-212 and Ra-224, it should be noted that the system and method are not limited thereto, and other radioisotopes of lead may also be separated from radioisotopes of radium and/or thorium. Also, the contents of the aqueous solutions depicted in FIG. 1 are exemplary, and other aqueous solution compositions can also be provided, such as any of those described herein.

According to certain embodiments, the chamber 108 of the first cartridge 102 contains a first chromatographic media comprising lead-complexing media that (i) preferentially binds the lead radioisotope over radioisotopes of radium and thorium in the presence of a first loading solution 102a containing the mixture, thereby separating the lead radioisotope from the first loading solution, and (ii) elutes the lead radioisotope in the presence of a first eluent 102b to form a first eluate 102c comprising the lead radioisotope dissolved in the second solution. For example, a method of separating the lead radioisotope from the mixture comprising the lead radioisotope and the radioisotope of radium or thorium can comprise loading the first cartridge 102 (through the cartridge inlet) with a first loading solution 102a comprising the mixture, the first cartridge containing the first chromatographic media comprising lead-complexing media that preferentially binds the lead radioisotope over radioisotopes of radium and thorium in the presence of the first loading solution, whereby the lead radioisotope is bound to the lead-complexing media and is separated from the first loading solution. According to certain aspects, by loading the first solution onto the first cartridge having the lead-complexing media that preferentially binds the lead radioisotope thereto, the lead radioisotope remains bound (absorbed) to the media while the rest of the first loading solution that does not bind to the media, including radioisotopes of radium and thorium, passes through and out of the cartridge as spent solution 102(e). The spent solution can be either discarded, or can be optionally treated and recycled back to the original mixture 110 and/or back to the first cartridge for further extraction of lead radioisotope therefrom. According to certain embodiments, the method further comprises eluting the bound lead radioisotope from the first cartridge with a first eluent 102b (introduced through the cartridge inlet), to form a first eluate 102c (flowing from the cartridge outlet) comprising the lead radioisotope dissolved in the first eluate. That is, the first eluent is one that elutes the bound lead from the lead-complexing media to flow the lead out of the first cartridge.

According to certain embodiments, a rinsing solution 102d may also be provided to the first cartridge, after loading of the first solution and before elution of the bound lead with the first eluent, to further rinse radium and thorium radioisotopes from the cartridge and any other impurities. Rinsing solution 102d that passes through the cartridge similarly forms spent solution 102(e) that can also be discarded, or can optionally treated and recycled back to the original mixture 110 and/or back to the first cartridge for further extraction of lead radioisotope therefrom, and the rinsing solution may have similar aqueous composition as the loading solution, albeit without radioisotopes.

According to certain embodiments, the chamber 108 of the second cartridge 104 contains a second chromatographic media comprising a weak cationic exchange media that (i) preferentially binds the lead radioisotope over radioisotopes of radium and thorium from a second loading solution comprising the first eluate, thereby separating the lead radioisotope from the second loading solution, and (ii) elutes the lead radioisotope in the presence of a second eluent to form a second eluate comprising the lead radioisotope dissolved in the second eluate. For example, according to one embodiment, the method of separating lead radioisotope from the radium and/or thorium radioisotope comprise loading the second cartridge 104 with a second loading solution 104a (through the cartridge inlet) comprising the first eluate 102c, the second cartridge having a second chromatographic media comprising a weak cationic exchange media that preferentially binds the lead radioisotope over radioisotopes of radium and thorium in the presence of the second loading solution, whereby the lead radioisotope is bound to the weak cationic exchange media and separated from the second loading solution. According to certain aspects, by loading the second solution onto the second cartridge having the weak cationic exchange media that preferentially binds the lead radioisotope thereto, the lead radioisotope remains bound to the media while the rest of the second loading solution that does not bind to the media, including radioisotopes of radium and thorium, passes through and out of the cartridge as spent solution 104(e). The spent solution 104(e) can be either discarded, or can be optionally treated and recycled back to the original mixture 110 and/or back to the first cartridge, and/or can be optionally treated and recycled back to the second cartridge for further extraction of lead radioisotope therefrom.

According to certain embodiments, the method further comprises eluting the bound lead radioisotope from the second cartridge with a second eluent 104b (introduced through the cartridge inlet), to form a second eluate 104c (flowing from the cartridge outlet) comprising the lead radioisotope dissolved in the second eluate. That is, the second eluent is one that elutes the bound lead from the weak cationic exchange media to flow the lead out of the second cartridge.

According to certain embodiments, a rinsing solution 104d may also be provided to the second cartridge, after loading of the second solution and before elution of the bound lead with the second eluent, to further rinse radium and thorium radioisotopes from the cartridge and any other impurities. Rinsing solution 104d that passes through the cartridge similarly forms spent solution 104(e) that can also be discarded, or can be optionally treated and recycled back to the original mixture 110 and/or back to the first cartridge, and/or can be optionally treated and recycled back to the second cartridge for further extraction of lead radioisotope therefrom, and the rinsing solution may have similar aqueous composition as the loading solution, albeit without radioisotopes.

According to one embodiment, the second loading solution has a pH, $pH^{2L}$, the second eluent has a pH, $pH^{2E}$, and $pH^{2L}$ is greater than $pH^{2E}$. That is, a pH of a second eluent used to elute from the second cartridge may be lower than a pH of the second loading solution used to load onto the second cartridge. According to another embodiment, the first loading solution has a pH, $pH^{1L}$, and the first eluent has a pH, $pH^{1E}$, and $pH^{1E}$ is greater than $pH^{1L}$. That is, a pH of the first eluent used to elute from the first cartridge may be higher than a pH of the first loading solution used to load onto the first cartridge.

According to one embodiment, the first cartridge comprises lead-complexing media that is ionically neutral media. For example, according to one embodiment, the lead-complexing media may include any one of more of a diglycolamide-complexing moiety and a crown ether-complexing moiety. According to one embodiment, the first cartridge comprises lead-complexing media that is any one or more of is 4,4'(5')-di-t-butylcyclohexano 18-crown-6 (Pb Resin, with isodecanol as diluent), 4,4'(5')-di-t-bytulcyclohexano 18-crown-6 (Sr Resin, with 1-octanol as diluent), N,N,N'N'-tetraoctyl diglycolamide (TODGA), and N,N, N'N'-tetraamyl diglycolamide (TPDGA). In yet another embodiment, the lead-chelating media for the first cartridge can any of the lead-complexing media described herein, such as those shown in Table 1.

According to one embodiment, the media for the second cartridge comprises weak cationic exchange media comprising carboxyalkyl ionizable groups bound to a silica-based support. For example, according to certain embodiments, the weak cationic exchange media can comprise any one or more of CM-silica, BioSuite CM, and Sep-Pak Accell Plus CM. In yet another embodiment, the weak cationic exchange media for the second cartridge can any of the weak cationic exchange media described herein, such as those shown in Table 1.

According to one embodiment, the first loading solution provided to load lead onto the first cartridge comprises mineral acid. For example, the mineral acid present in the first loading solution is any one or more of $HNO_3$, HCl, HBr, HI and $H_2SO_4$. According to certain embodiments, the concentration of the first loading solution comprising the mineral acid is in the range of 0.1-10 M, 0.1-8 M, 0.2-8 M, 0.5-5 M, 1-4 M, 1-3 M, and/or about 2M.

In one embodiment, the first loading solution provided to the first cartridge comprises lead and radium radioisotopes in an aqueous (liquid) form in nitric acid ($HNO_3$). The first loading solution may be contained and stored in a vessel (i.e. the original vessel). The concentration of nitric acid in the aqueous form of the first loading solution can range from 0.1-10 M, preferably at 0.1-8 M, more preferably at 0.2-8 M, more preferably at 0.5-5 M, more preferably at 1-4 M, more preferably at 1-3 M, and more preferably at about 2 M. Upon loading the first cartridge with the first loading solution, the lead radioisotope in the first loading solution is adsorbed onto the media of the first cartridge. The radium and/or thorium radioisotopes in the first solution pass through from the first cartridge and can be recovered and collected in a vessel with recovery rate at least 95%, at least 96%, at least 97%, at least 98%, or at least 99%. The collecting vessel for recovering radium and/or thorium can be the original vessel that contained the first loading solution radium and/or thorium and lead, or it can be a separate vessel.

In one embodiment, the first cartridge is also rinsed with nitric acid ($HNO_3$). The rinse product can be collected in the original vessel or a separate vessel. The concentration of nitric acid used for the first rinsing solution can be from 0.1-3 M, more preferably 0.5-2.5 M, more preferably 1.5-2.5 M, yet more preferably at 2 M. One or multiple rinses may be carried out.

According to certain aspects, the radium radioisotope passing through from the first cartridge (e.g. in spent solution 102(e)) can be recycled for further use in generating lead, such as for example by further extraction process to extract lead from solutions comprising the radium radioisotope, or by allowing the collected radium to further decay to produce further lead radioisotope, which can then be separated and extracted via the system and processes described herein. This system and method allows for lead generation from radium that is in solution, which can be a more stable form radiolytically than radium stored on a storage media. The recovered radium can be further concentrated to reduce the volume and increase the concentration of radium in the aqueous form, such as in nitric acid.

According to one embodiment, the first eluent provided to elute lead radioisotope from the first cartridge comprises a weak acid. For example, according to one embodiment, the first eluent comprising the weak acid comprises a pH in the range of from 1 to 5.5, 2-5, 3-5, 4-5, and and/or 4.5. According to one embodiment, the weak acid comprises any one or more of any of carboxylate groups, sulfate groups, or phosphate groups, that are in equilibrium with the acidic form of these groups. For example, the weak acid may be a buffered solution that is optionally adjusted to a suitable pH. According to one embodiment, the weak acid is prepared from a salt of any one or more of acetate, citrate, and oxalate. The salt that forms the counterion can comprise any pharmaceutically acceptable salts, such as for example sodium and/or ammonium acetate. In one embodiment, the weak acid is prepared from ammonium acetate. According to one embodiment, the weak acid can comprise a concentration in the first eluent of from 0.1 to 2.0 M, from 0.5-1.5 M, from 0.75-1.25 M, and/or about 1 M.

In one embodiment, the lead adsorbed onto the first cartridge is eluted with a first eluent comprising weak acid formed from a carboxylate bearing salt (i.e. acetate, oxalate, or citrate) salt with a sodium or ammonium counterion. Several types of carboxylate bearing salts may be used for eluting lead from the first cartridge. In one embodiment, the salt is ammonium acetate. The concentration of ammonium acetate in the first eluent can be from 0.1 to 2.0 M, preferably from 0.5-1.5 M, more preferably from 0.75-1.25 M, yet more preferably at 1 M. The pH of the weak acid in the first eluent can be buffered from 1 to 5.5, preferably 2-5, more preferably 3-5, more preferably 4-5, and more preferably at 4.5. In addition to carboxylates, the salt could also be sulfate or phosphate bearing.

In one embodiment, the first eluent provided to elute lead radioisotope from the first cartridge comprises dilute mineral acid. For example, in one embodiment, the first eluent comprises dilute mineral acid comprising any of $HNO_3$, HCl, HBr, HI and $H_2SO_4$. According to one embodiment, the first eluent comprises dilute mineral acid having a concentration of no more than 0.1M, such as 0.001-0.1 M, and/or 0.01-0.1M.

In one embodiment, the lead adsorbed onto the first cartridge is eluted with a higher concentration of mineral acid. For example, the first eluent can comprise more concentrated mineral acid comprising any of $HNO_3$, HCl, HBr, HI and $H_2SO_4$. As an example, the concentration of mineral acid in the first eluent can be greater than 4 M, such as from 4 to 10 M, and even greater than 5 M, such as from 5 to 10 M.

According to one embodiment, the second loading solution that is provided to load lead radioisotope onto the second cartridge is the first eluate that is formed when the first eluent is provided to the first cartridge to elute the lead radioisotope from the cartridge. For example, the first eluate may be flowed directly from the first cartridge to the second cartridge to act as the second loading solution. According to one embodiment, the first eluate is flowed without modification from the first cartridge to the second cartridge. According to another embodiment, the first eluate can be modified to form the second loading solution before loading onto the second cartridge, such as by adjusting the pH of the solution.

According to one embodiment, the second loading solution comprises weak acid, such as for example the weak acid used as the first eluent, which passes through the first cartridge to form the first eluate. According to one embodiment, the second loading solution comprising the weak acid comprises a pH in the range of from 1 to 5.5, 2-5, 3-5, 4-5, and and/or 4.5. According to one embodiment, the weak acid comprises any one or more of any of carboxylate groups, sulfate groups, or phosphate groups, that are in equilibrium with the acidic form of these groups. For example, the weak acid may be a buffered solution that is optionally adjusted to a suitable pH. According to one embodiment, the weak acid is prepared from a salt of any one or more of acetate, citrate, and oxalate. The salt that forms the counterion can comprise any pharmaceutically acceptable salts, such as for example sodium and/or ammonium acetate. In one embodiment, the weak acid is prepared from ammonium acetate. According to one embodiment, the weak acid can comprise a concentration in the first eluent of from 0.1 to 2.0 M, from 0.5-1.5 M, from 0.75-1.25 M, and/or about 1 M.

In one embodiment, the second loading solution provided to load lead radioisotope onto the second cartridge comprises dilute mineral acid. For example, in one embodiment, the second loading solution comprises dilute mineral acid comprising any of $HNO_3$, HCl, HBr, HI and $H_2SO_4$. According to one embodiment, the second loading solution comprises dilute mineral acid having a concentration no more than 0.1M, such as 0.001-0.1 M, and/or 0.01-0.1M.

In one embodiment, the second loading solution can comprise more concentrated mineral acid comprising any of $HNO_3$, HCl, HBr, HI and $H_2SO_4$. As an example, the concentration of mineral acid in the second loading solution can be greater than 4 M, such as from 4 to 10 M, and even greater than 5 M, such as from 5 to 10 M.

According to one embodiment, the second cartridge may be further rinsed, after loading with the second loading solution, and before eluting with the second eluent. For example, the second cartridge may be rinsed with a rinsing solution having the same acid as that used in the second loading solution, albeit without radioisotopes. The second solution may further rinse radium and/or thorium radioisotopes from the second cartridge, and the rinse solution may be discarded or may be optionally treated and recycled back to the original solution mixture, back to the first cartridge, and/or back to the second cartridge. According to one embodiment, a solution used for rinsing the second cartridge is dilute HCl. According to certain aspects, the concentration of HCl for rinsing may typically be from 0.001 to 0.1 M, and/or 0.01 to 0.1 M, although in certain embodiments the concentration may also be from 0.001 to 1 M, such as 0.005-0.5 M, and even 0.01 to 0.25 M.

According to one embodiment, the second eluent use to elute lead radioisotope from the second cartridge comprises mineral acid. For example, according to one embodiment, the second eluent comprises any one or more of $HNO_3$, HCl, HBr, HI and $H_2SO_4$. According to one embodiment, the second eluent comprises mineral acid in a concentration of from 0.01 to 5 M, 0.02-4 M, 0.02-3 M, and/or 0.02-2 M. For example, according to one embodiment, in a case where the second loading solution is dilute mineral acid, the second eluent may comprise a higher concentration of mineral acid. According to one embodiment, the second eluent comprises mineral acid in a concentration sufficient to form an anionic form of lead in the second eluent. For example, according to certain aspects, the anionic form of lead comprises $PbCl4^{2-}$.

In one embodiment, the lead adsorbed onto the secondary cartridge is eluted with second eluent that is hydrochloric acid (HCl). The concentration of HCl can be from 0.01 to 5 M, preferably 0.02-4 M, more preferably 0.02-3 M, and more preferably 0.02-2 M (e.g., 0.05 M, 0.5 M, 1 M, or 2 M).

Additional Cartridges

Figure 2:
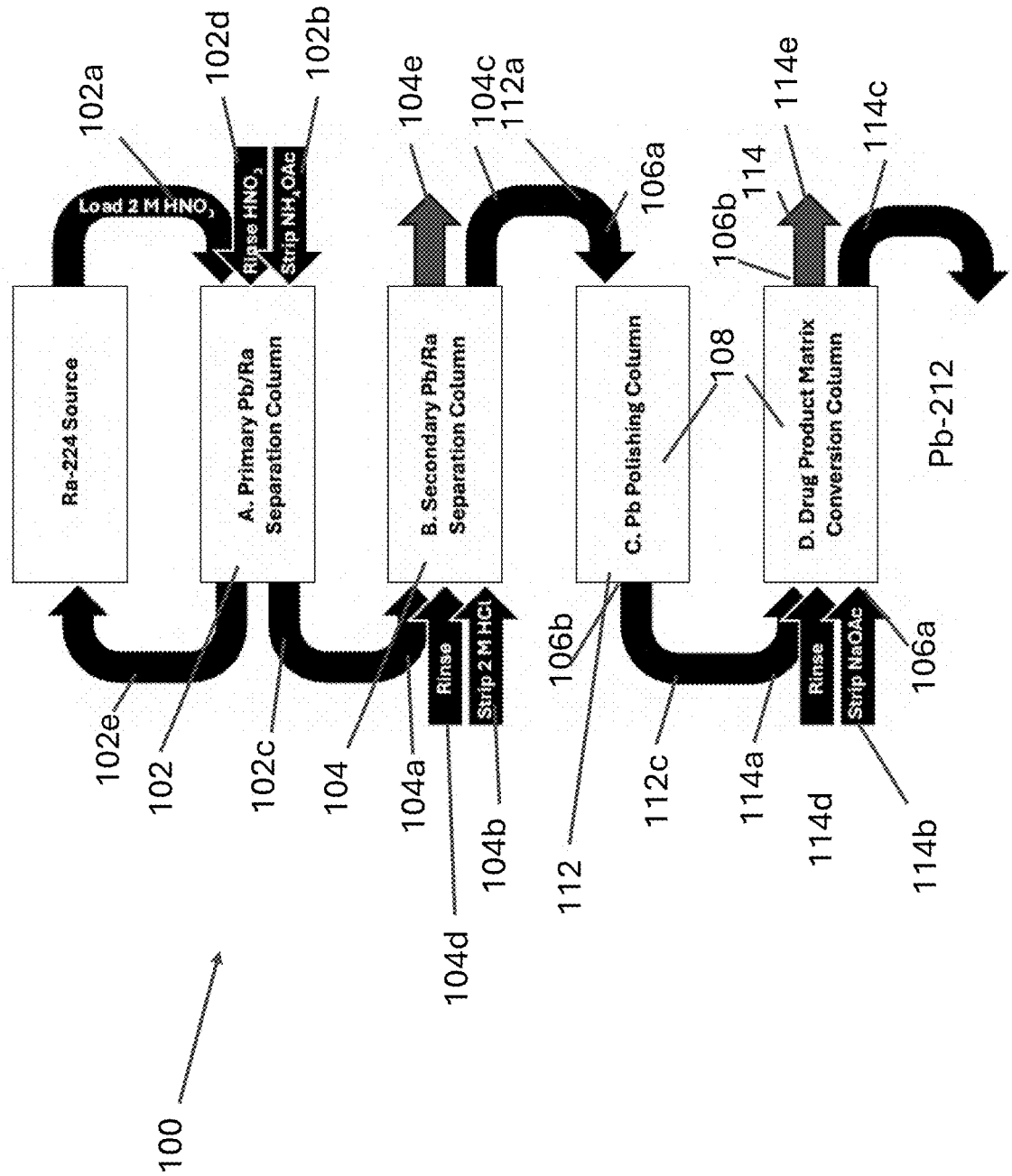
FIG. 2. is a flowchart illustrating steps for separating a lead radioisotope (e.g. Pb-212) from a mixture comprising the lead radioisotope and a radioisotope of radium (e.g. Ra-224) or thorium (e.g. Th-228) using up to four sequential cartridges for separation, according to one embodiment.

In another aspect, the system 100 disclosed herein for isolating and purifying lead radioisotopes from aqueous radium and/or thorium radioisotopes can further comprise additional cartridges, in addition to the first and second cartridges as described above. In one embodiment, the system further comprises a third cartridge 112, as illustrated in FIG. 2. In one embodiment, the system further comprises a third cartridge 112 and a fourth cartridge 114, as illustrated in FIG. 2. According to certain embodiments, any residual radium radioisotope that may be in the eluate of the second cartridge can be adsorbed onto the resin of the third cartridge while lead radioisotope can pass through for collection, or for adsorption onto the fourth cartridge.

For example, referring to FIG. 2, according to certain embodiments, the system 100 further comprises a third cartridge (Pb Polishing Column in FIG. 2) 114 in series with one or more of the first and second cartridges. The third cartridge comprises its own separate inlet 106a, outlet 106b, and its own separate chamber 108 between the inlet and outlet for that cartridge, containing chromatographic media. According to embodiments herein, loading solutions, rinsing solutions, eluents etc. may be introduced to third cartridge at the cartridge inlet, and pass through the chamber to the cartridge outlet, where eluate and spent solutions leave the cartridge. While FIG. 2 depicts the specific radioisotopes Pb-212 and Ra-224, it should be noted that the system and method are not limited thereto, and other radioisotopes of lead may also be separated from radioisotopes of radium and/or thorium. Also, the contents of the aqueous solutions depicted in FIG. 1 are exemplary, and other aqueous solution compositions can also be provided, such as any of those described herein.

According to certain embodiments, the chamber 108 of the third cartridge 102 contains chromatographic media comprising strong cationic exchange media that (i) preferentially binds radioisotopes of radium or thorium over the lead radioisotope in the presence of a third loading solution 112a containing the second eluate 104c, thereby separating the radioisotope of radium or thorium from the third loading solution 112a, and (ii) passes through the lead radioisotope in the third loading solution 112a to form a third lead-containing solution 112c having the lead radioisotope dissolved therein and having a reduced content of the radioisotope of radium or thorium as compared to a content of the radioisotope of radium or thorium in the second eluate 104c. That is, the strong cationic exchange media of the third cartridge may preferentially bind radium or thorium radioisotopes while allowing lead radioisotopes to pass therethrough, thereby further purifying the lead radioisotopes in the solution that passes through the cartridge. For example, according to one embodiment, a method can comprise loading the third cartridge (through the cartridge inlet) with the third loading solution 112a comprising the second eluate 104c, the third cartridge having the third chromatographic media comprising the strong cationic exchange media that preferentially binds radioisotopes of radium or thorium over the lead radioisotope in the presence of the third loading solution 112a, thereby separating the radioisotope of radium or thorium from the third loading solution 112a, to form a third lead-containing solution 112c having the lead radioisotope dissolved therein and having a reduced content of the radioisotope of radium or thorium as compared to a content of the radioisotope of radium or thorium in the second eluate 104c. The third lead-containing solution 112c may be collected and used, for example for radionuclide medical purposes including the radionuclide labeling of radiopharmaceutical compounds for diagnosis and/or treatment.

According to certain embodiments, a rinsing solution 112d may also be provided to the third cartridge, after the third loading solution 112a has been introduced and formed the solution 112c. Rinsing solution 112d that passes through the cartridge may be collected and used, similarly to the third lead-containing solution 112c, such as for example by combining with the third lead-containing solution or subsequent rinses of the third cartridge. According to one embodiment, the rinsing solution 112d solution that is used for rinsing the third cartridge is HCl. For example, the rinsing solution 112d may comprise concentration of HCl of from 0.01 to 5 M, preferably 0.02-4 M, more preferably 0.02-3 M, and more preferably 0.02-2 M (e.g., 0.05 M, 0.5 M, 1 M, or 2 M). As yet another option, the third lead-containing solution 112c may be recycled back to the third cartridge for further removal of radium and/or thorium radioisotopes.

According to one embodiment, the strong cationic exchange media contained in the third cartridge comprises comprising sulfonic acid groups. According to one embodiment, the strong cationic exchange media comprises sulfonic acid groups bound to divinyl benzene.

According to one embodiment the third loading solution used to load the third cartridge corresponds to the second eluate. For example, according to one embodiment, the second eluate is flowed without modification from the second cartridge to the third cartridge. According to another embodiment, the second eluate is modified to form the third loading solution before loading onto the third cartridge, such as by adjusting the pH of the second eluate to from the third loading solution.

According to one embodiment, the third loading solution used to load the third cartridge comprises mineral acid. For example, according to one embodiment, the third loading solution comprises any one or more of $HNO_3$, HCl, HBr, HI and $H_2SO_4$. According to one embodiment, the third loading solution comprises mineral acid in a concentration of from 0.01 to 5 M, 0.02-4 M, 0.02-3 M, and/or 0.02-2 M. According to one embodiment, the third loading solution comprises mineral acid in a concentration sufficient to form an anionic form of lead in the third loading solution. According to one embodiment, the third loading solution comprises HCl.

According to one embodiment, the third lead-containing solution corresponds to the third loading solution as passed through the third cartridge, and with a reduced content of the isotope of radium or thorium as compared to the third loading solution.

Referring again to FIG. 2, according to certain embodiments, the system 100 further comprises a fourth cartridge (Drug Product Matrix Conversion Column in FIG. 2) 114 in series with one or more of the first, second and third cartridges. The fourth cartridge comprises its own separate inlet 106a, outlet 106b, and its own separate chamber 108 between the inlet and outlet for that cartridge, containing chromatographic media. According to embodiments herein, loading solutions, rinsing solutions, eluents etc. may be introduced to fourth cartridge at the cartridge inlet, and pass through the chamber to the cartridge outlet, where eluate and spent solutions leave the cartridge. While FIG. 2 depicts the specific radioisotopes Pb-212 and Ra-224, it should be noted that the system and method are not limited thereto, and other radioisotopes of lead may also be separated from radioisotopes of radium and/or thorium. Also, the contents of the aqueous solutions depicted in FIG. 1 are exemplary, and other aqueous solution compositions can also be provided, such as any of those described herein.

According to certain embodiments, the chamber 108 of the fourth cartridge 114 contains a fourth chromatographic media comprising lead-complexing media that (i) preferentially binds the lead radioisotope over radioisotopes of radium and thorium in the presence of a fourth loading solution 114a comprising the third lead-containing solution 112c, thereby separating the lead radioisotope from the fourth loading solution, and (ii) elutes the lead radioisotope in the presence of a fourth eluent introduced to the lead-complexing media to form a fourth eluate comprising the lead radioisotope dissolved in the fourth eluate. For example, a method of separating the lead radioisotope from a fourth loading solution comprising the third lead-containing solution can comprise loading the fourth cartridge 114 (through the cartridge inlet) with a fourth loading solution 114a comprising the third elate 112c, the fourth cartridge containing the fourth chromatographic media comprising lead-complexing media that preferentially binds the lead radioisotope over radioisotopes of radium and thorium in the presence of the fourth loading solution, whereby the lead radioisotope is bound to the lead-complexing media and is separated from the fourth loading solution. According to certain aspects, by loading the fourth solution onto the fourth cartridge having the lead-complexing media that preferentially binds the lead radioisotope thereto, the lead radioisotope remains bound to the media while the rest of the fourth loading solution that does not bind to the media, including radioisotopes of radium and thorium, passes through and out of the cartridge as spent solution 114(e). The spent solution can be either discarded, or can be optionally treated and recycled back to the original mixture 110 and/or back to any of the first cartridge through third cartridges for further extraction of lead radioisotope therefrom. According to certain embodiments, the method further comprises eluting the bound lead radioisotope from the fourth cartridge with a fourth eluent 114b (introduced through the cartridge inlet), to form a fourth eluate 1114c (flowing from the cartridge outlet) comprising the lead radioisotope dissolved in the fourth eluate. That is, the fourth eluent is one that elutes the bound lead from the lead-complexing media to flow the lead out of the fourth cartridge.

According to one embodiment, the fourth loading solution used to load the fourth cartridge has a pH, $pH^{4L}$, and the fourth eluent has a pH, $pH^{4E}$, and $pH^{4E}$ is greater than $pH^{4L}$.

According to certain embodiments, a rinsing solution 114d may also be provided to the fourth cartridge, after loading of the fourth loading solution and before elution of the bound lead with the fourth eluent, to further rinse radium and thorium radioisotopes from the cartridge and any other impurities. Rinsing solution 114d that passes through the cartridge similarly forms spent solution 114(e) that can also be discarded, or can optionally treated and recycled back to the original mixture 110 and/or back to any of the first through third cartridges for further extraction of lead radioisotope therefrom, and the rinsing solution may have similar aqueous composition as the loading solution, albeit without radioisotopes. According to one embodiment, the fourth cartridge is rinsed with HCl, such as HCl in a concentration of from 0.01 to 5 M, preferably 0.02-4 M, more preferably 0.02-3 M, and more preferably 0.02-2 M (e.g., 0.05 M, 0.5 M, 1 M, or 2 M).

According to one embodiment, the fourth cartridge comprises a type of lead-complexing media that is the same as a type of the lead-complexing media in the first cartridge. According to one embodiment, the fourth cartridge comprises lead-complexing media that is ionically neutral media. For example, according to one embodiment, the lead-complexing media may include any one of more of a diglycolamide-complexing moiety and a crown ether-complexing moiety. According to one embodiment, the fourth cartridge comprises lead-complexing media that is any one or more of is 4,4'(5')-di-t-butylcyclohexano 18-crown-6 (Pb Resin, with isodecanol as diluent),4,4'(5')-di-t-bytulcyclohexano 18-crown-6 (Sr Resin, with 1-octanol as diluent),N,N,N'N'-tetraoctyl diglycolamide (TODGA), N,N,N'N'-tetraamyl diglycolamide (TPDGA). In yet another embodiment, the lead-chelating media for the fourth cartridge can any of the lead-complexing media described herein, such as those shown in Table 1, and/or may be other than the lead-complexing media provided in the first cartridge.

According to one embodiment, the fourth loading solution is the third lead-containing solution. For example, according to one embodiment, the third lead-containing solution may be flowed without modification from the third cartridge to the fourth cartridge. According to another embodiment, the third lead-containing solution may be modified to form the fourth loading solution before loading onto the fourth cartridge.

According to one embodiment, the fourth loading solution used to load the fourth cartridge comprises mineral acid. For example, according to one embodiment, the fourth loading solution comprises any one or more of $HNO_3$, HCl, HBr, HI and $H_2SO_4$. According to one embodiment, the fourth loading solution comprises mineral acid in a concentration of from 0.01 to 5 M, 0.02-4 M, 0.02-3 M, and/or 0.02-2 M. According to one embodiment, the fourth loading solution comprises HCl.

According to one embodiment, the fourth eluent provided to elute lead radioisotope from the fourth cartridge comprises a weak acid. For example, according to one embodiment, the fourth eluent comprising the weak acid comprises a pH in the range of from 1 to 5.5, 2-5, 3-5, 4-5, and and/or 4.5. According to one embodiment, the weak acid comprises any one or more of any of carboxylate groups, sulfate groups, or phosphate groups, that are in equilibrium with the acidic form of these groups. For example, the weak acid may be a buffered solution that is optionally adjusted to a suitable pH. According to one embodiment, the weak acid is prepared from a salt of any one or more of acetate, citrate, and oxalate. The salt that forms the counterion can comprise any pharmaceutically acceptable salts, such as for example sodium and/or ammonium acetate. In one embodiment, the weak acid is prepared from ammonium acetate. According to one embodiment, the weak acid can comprise a concentration in the fourth eluent of from 0.1 to 2.0 M, from 0.5-1.5 M, from 0.75-1.25 M, and/or about 1 M.

In one embodiment, the lead adsorbed onto the fourth cartridge is eluted with a fourth eluent comprising weak acid formed from a carboxylate bearing salt (i.e. acetate, oxalate, or citrate) salt with a sodium or ammonium counterion. Several types of carboxylate bearing salts may be used for eluting lead from the first cartridge. In one embodiment, the salt is ammonium acetate. The concentration of ammonium acetate in the fourth eluent can be from 0.1 to 2.0 M, preferably from 0.5-1.5 M, more preferably from 0.75-1.25 M, yet more preferably at 1 M. The pH of the weak acid in the fourth eluent can be buffered from 1 to 5.5, preferably 2-5, more preferably 3-5, more preferably 4-5, and more preferably at 4.5. In addition to carboxylates, the salt could also be sulfate or phosphate bearing.

In one embodiment, the fourth eluent provided to elute lead radioisotope from the fourth cartridge comprises dilute mineral acid. For example, in one embodiment, the fourth eluent comprises dilute mineral acid comprising any of $HNO_3$, HCl, HBr, HI and $H_2SO_4$. According to one embodiment, the fourth eluent comprises dilute mineral acid having a concentration no more than 0.1M, such as 0.001-0.1 M, and/or 0.01-0.1 M.

In one embodiment, the lead adsorbed onto the fourth cartridge is eluted with hydrochloric acid (HCl). The concentration of HCl can be from 0.01 to 5 M, preferably 0.02-4 M, more preferably 0.02-3 M, and more preferably 0.1-2 M (e.g., 0.1 M, 1 M, or 2 M).

In one embodiment, the lead adsorbed onto the fourth cartridge is eluted with a higher concentration of mineral acid. For example, the fourth eluent can comprise more concentrated mineral acid comprising any of $HNO_3$, HCl, HBr, HI and $H_2SO_4$. As an example, the concentration of mineral acid in the fourth eluent can be greater than 4 M, such as from 4 to 10 M, and even greater than 5 M, such as from 5 to 10 M.

According to certain embodiments, the fourth eluant may be collected and used for radionuclide medical purposes, such as in the radiolabeling of radiopharmaceuticals with lead radioisotopes. According to further embodiments, the fourth eluant may be modified, such as for example by increasing or decreasing pH, or adding other stabilizers thereto.

According to certain embodiments, a method of manufacturing a radiopharmaceutical comprises introducing an unchelated radiopharmaceutical to an aqueous solution comprising any of the second to the fourth eluate, to form a lead radioisotope-chelated radiopharmaceutical. According to another embodiment, a radiopharmaceutical comprises a radiolabeled chelator prepared according to the method of manufacture.

According to a further embodiment, the positions of the third and second cartridges in the system can be switched, such that the third cartridge receives first eluate from the first cartridge from the first cartridge, and the second cartridge receives third lead-containing solution from the third cartridge (the fourth cartridge would then receive second eluate from the second cartridge). In an embodiment of a process with this configuration, the processing would involve loading the third cartridge with a third loading solution comprising the first eluate, the third cartridge having third chromatographic media comprising the strong cationic exchange media that preferentially binds radioisotopes of radium or thorium over the lead radioisotope in the presence of the loading solution, thereby separating the radioisotope of radium or thorium from the third loading solution, to form a third lead-containing solution having the lead radioisotope dissolved therein and having a reduced content of the radioisotope of radium or thorium as compared to a content of the radioisotope of radium or thorium in the first eluate. The third lead-containing solution would then be provided to the second cartridge as the second loading solution. According to this embodiment, if the fourth cartridge were also used as a part of this system with the second and third cartridges having their arrangement in the series reversed, then the process would further comprise loading the fourth cartridge with a fourth loading solution comprising the second eluate, the fourth cartridge having the fourth chromatographic media comprising lead-complexing media that preferentially binds the lead radioisotope over radioisotopes of radium and thorium in the presence of the fourth loading solution, thereby separating the lead radioisotope from the fourth loading solution, and eluting the bound lead radioisotope from the fourth cartridge with the fourth eluent, to form the fourth eluate comprising the lead radioisotope dissolved in the fourth eluate.

Measurement of Purity and Yield

In the present disclosure, the purity of radium can be measured using rapid alpha spectrometry measurement and Ra-224 decay via liquid scintillation counting. The yield of radium can be measured using liquid scintillation counting and HPGe gamma analysis. The yield of lead can be measured using HPGe gamma analysis.

According to certain embodiments here, a yield of lead isotope resulting from processing with the system 100 (e.g. the first and second cartridges, or all four cartridges) is at least 80%, at least 90% and/or at least 95%. A radiochemical purity of the lead isotope (with respect to all parent isotopes) processed according to the system described herein may be at least 95%, such as at least 99.9%, at least 99.99%, at least 99.999%, at least 99.9999% and/or at least 99.999990%. That is, according to certain embodiments, a radiochemical purity of Pb-212 with respect to its parent isotopes) may be at least 95%, such as at least 99.9%, at least 99.99%, at least 99.999%, at least 99.9999% and/or at least 99.99999%.

According to certain aspects, a principle of these measurements is that isotopes of the same element have identical chemical behavior, and therefore a radiochemical tracer can be introduced to a system to calculate recovery and detection efficiencies [1-3]. It is generally expected that some chemical loses occur in chromatographic steps and during sample analysis (e.g., detection efficiency, source preparation losses) and therefore the use of another, exogeneous isotope, can allow for confirmation of the chemical yield of the analyte through the process. For $^2$Pb-212, a common tracer isotope is Pb-203. Pb-203 offers some advantages as it is easier to detect, has a more suitable half-life for research and development, and has a simpler decay scheme than Pb-212. This allows for Pb-203 to act as a tracer or surrogate for Pb-212 for studies looking at chemical separations (e.g. as in the Examples below). It is expected that Pb-203 and Pb-212 have identical chemical behavior through the entirety of the separation process.

EXAMPLES

The following examples are provided to illustrate aspects of the disclosure, and the invention is not limited thereto.

Example 1

Figure 3:
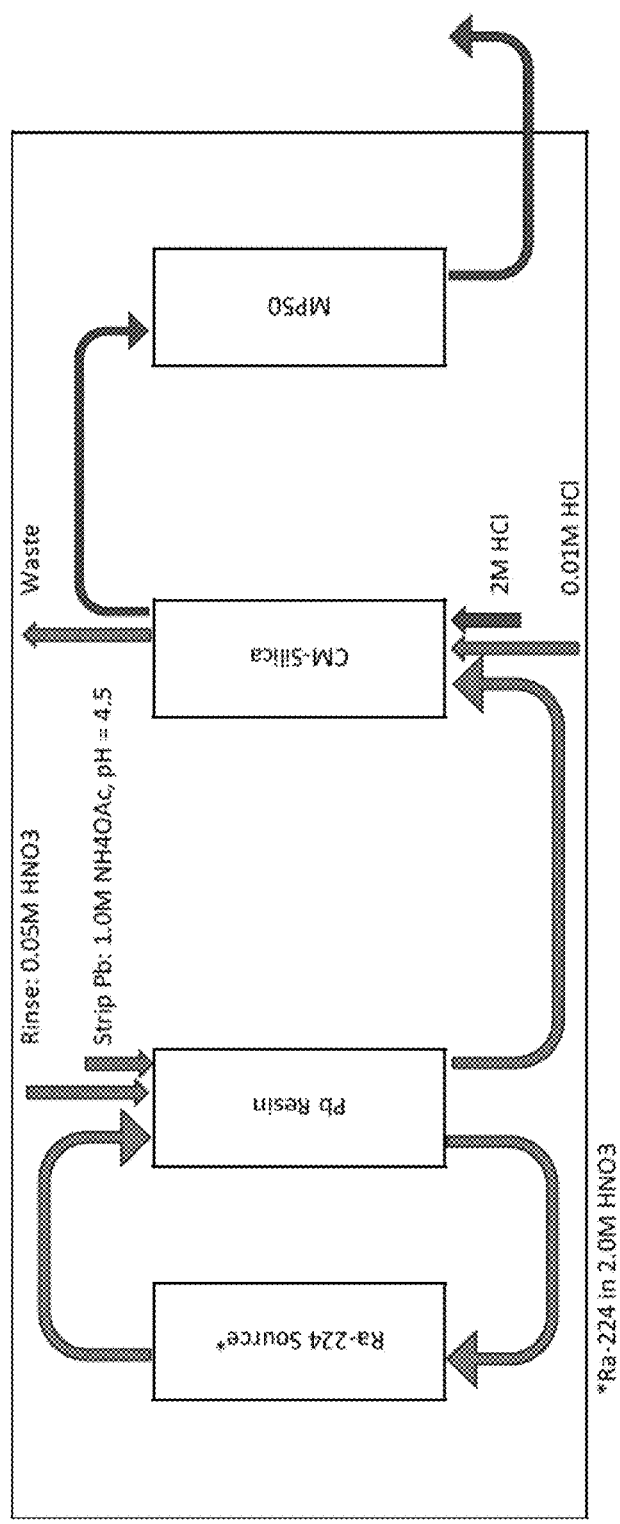
FIG. 3. is a flowchart illustrating steps for separating Pb-212 from a liquid source of Ra-224 as performed according to Example 1 herein.

FIG. 3 illustrates an embodiment of a flow schematic for the separation of Pb-212 from a liquid source of Ra-224, as used in this Example 1.

According to this example, an elution scheme utilized the following columns:
Primary Column (PC): QML Pb Resin, 50-100 μm, precondition 5 mL 2.0 M $HNO_3$
Secondary Column (SC): QML CM-Silica, 20-45 μm, precondition 5 mL 1.0 M ammonium acetate, pH 4.5
Third Column/Guard Column (GC): QML MP50, 75-150 μm The steps in the elution scheme were as follows:
1) Load Ra-224 source in 2.0 M $HNO_3$ (20 mL initially, 0.5 mL added each cycle) onto PC. Collect Ra-224 from PC in same source vessel.
2) Rinse PC with 0.5 mL 2.0 M $HNO_3$ into Ra-224 source vessel.
3) Remove Ra-224 source vessel. Place PC waste vial below PC.
4) Rinse PC with 9.5 mL 2.0 M $HNO_3$. Collect in PC waste vial.
5) Remove PC waste vial.
6) Add SC below PC.
7) Add SC waste vial below columns.
8) Transfer Pb-212 from PC to SC with 10 mL 1.0 M ammonium acetate, pH 4.5. Collect eluate in SC waste vial.
9) Remove PC.
10) Rinse SC with 10 mL 0.01 M HCl. Collect in SC waste vial.
11) Remove SC waste vial.
12) Add Pb-212 vial.
13) Add GC below SC.
14) Recover Pb-212 from SC through GC into Pb-212 vial with 4.0 mL 2.0 M HCl.

Figures 4A, 4B:
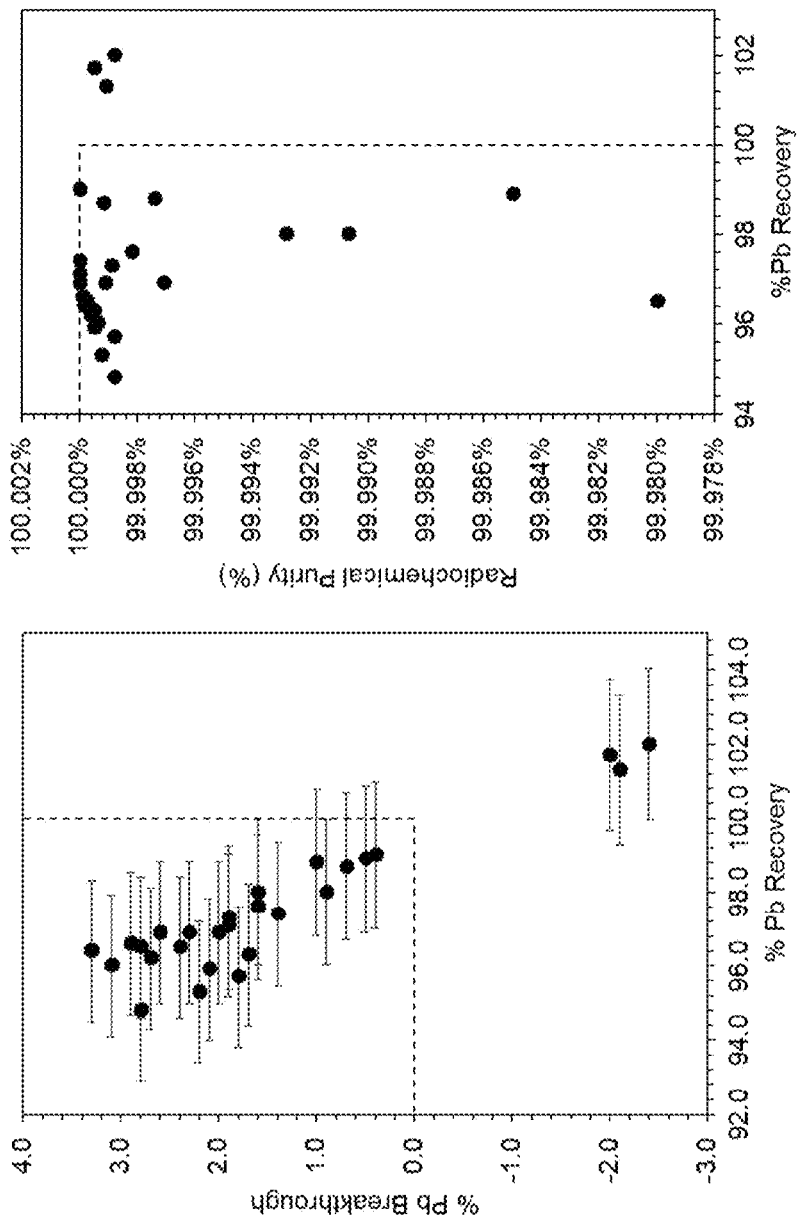
FIGS. 4a and 4b are plots showing the % Pb breakthrough and the radiochemical purity of the Pb-212 product as a function of % Pb, according to Example 1.

FIGS. 4a-4b show the % Pb breakthrough and the radio-chemical purity of the Pb-212 product as a function of the % Pb recovery in Example 1. The % Pb breakthrough is the amount of Pb-212 that elutes with the Ra-224 on the primary column. This Pb-212 is then included with Ra-224 and stored for future milkings of the Ra-224 source. The radiochemical purity of Pb is with respect to Ra-224 and/or Th-228. The radiochemical purity of Pb-212 does not take into account the ingrowth of Pb-212 decay products. The % Pb recovered is the amount of Pb-212 that is recovered in the entire separation schematic.

Example 2

Figure 5:
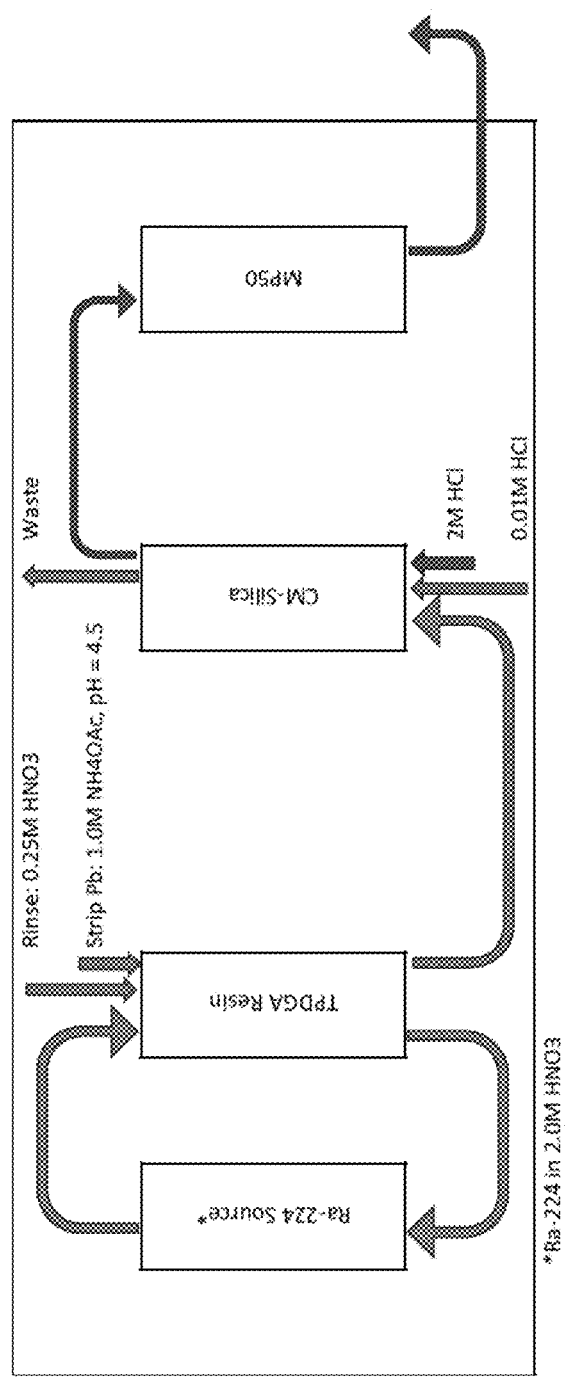
FIG. 5. is a flowchart illustrating steps for separating Pb-212 from a liquid source of Ra-224 as performed according to Example 2 herein.

FIG. 5 illustrates an embodiment of a flow schematic for the separation of Pb-212 from a liquid source of Ra-224, as used in this Example 2. The flow and parameters for Example were similar to Example 1, except for the following: (1) the PC is switched from Pb-resin to TPDGA and (2) the rinse solution for the PC is decreased to 0.25 M $HNO_3$.

According to this example, an elution scheme utilized the following columns:
Primary Column (PC): 1 mL TPDGA Resin, 50-100 μm, precondition 5 mL 2.0M $HNO_3$ Secondary Column (SC): QML CM-Silica, 20-45 μm, precondition 5 mL 1.0 M ammonium acetate, pH 4.5

Third Column/Guard Column (GC): QML MP50, 75-150 μm

The steps in the elution scheme were as follows:
1) Load Ra-224 source in 2.0 M HNO₃ (20 mL initially, 1.0 mL added each cycle) onto PC. Collect Ra-224 in same source vessel.
2) Rinse PC with 1.0 mL 0.25M HNO₃ into Ra-224 source.
3) Remove Ra-224 source vessel. Place PC waste vial below PC.
4) Rinse PC with 4.0 mL 0.25M HNO₃. Collect in PC waste vial.
5) Remove PC waste vial.
6) Add SC below PC.
7) Add SC waste vial below columns.
8) Transfer Pb-212 from PC to SC with 10 mL 1.0 M ammonium acetate, pH 4.5. Collect eluate in SC waste vial.
9) Remove PC.
10) Rinse SC with 10 mL 0.01M HCl. Collect in SC waste vial.
11) Remove SC waste vial.
12) Add Pb-212 vial.
13) Add GC below SC.
14) Recover Pb-212 from SC through GC into Pb-212 vial with 4.0 mL 2.0 M HCl.

Figure 6B:
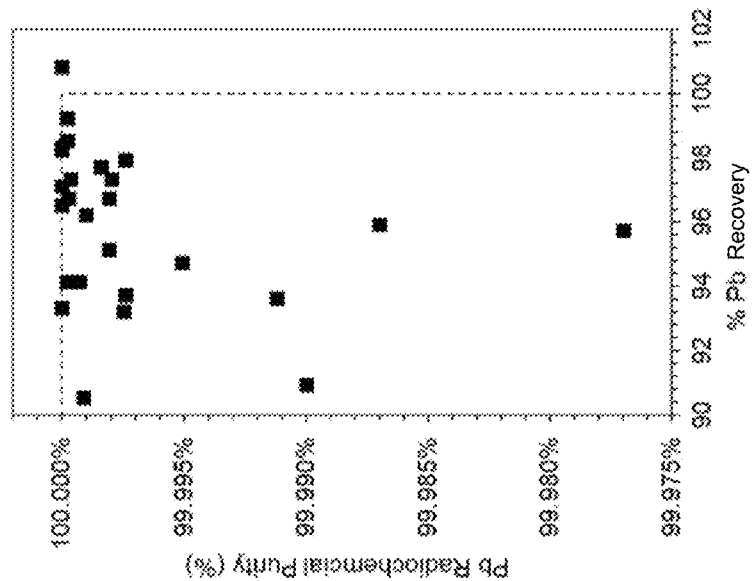
FIGS. 6a and 6b are plots showing the % Pb breakthrough and the radiochemical purity of the Pb-212 product as a function of % Pb, according to Example 2.
Figure 6A:
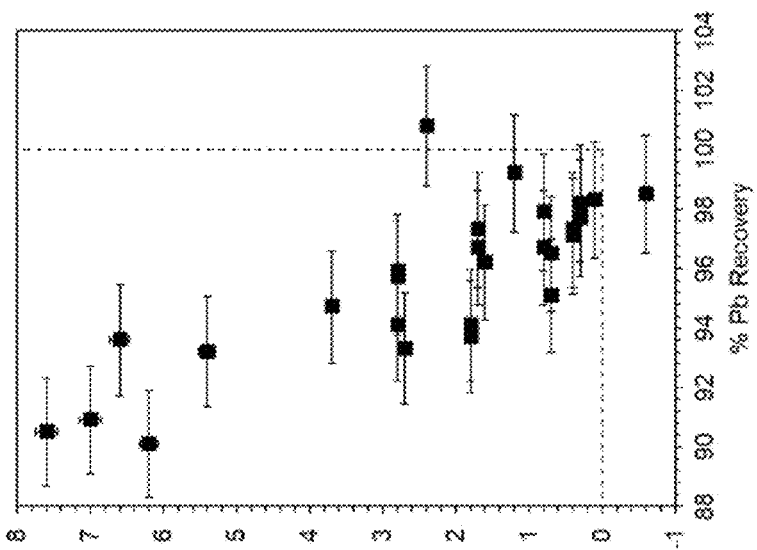

FIGS. 6a-6b show the % Pb breakthrough and the radiochemical purity of the Pb-212 product as a function of the % Pb recovery in Example 2.

Example 3

Figure 7:
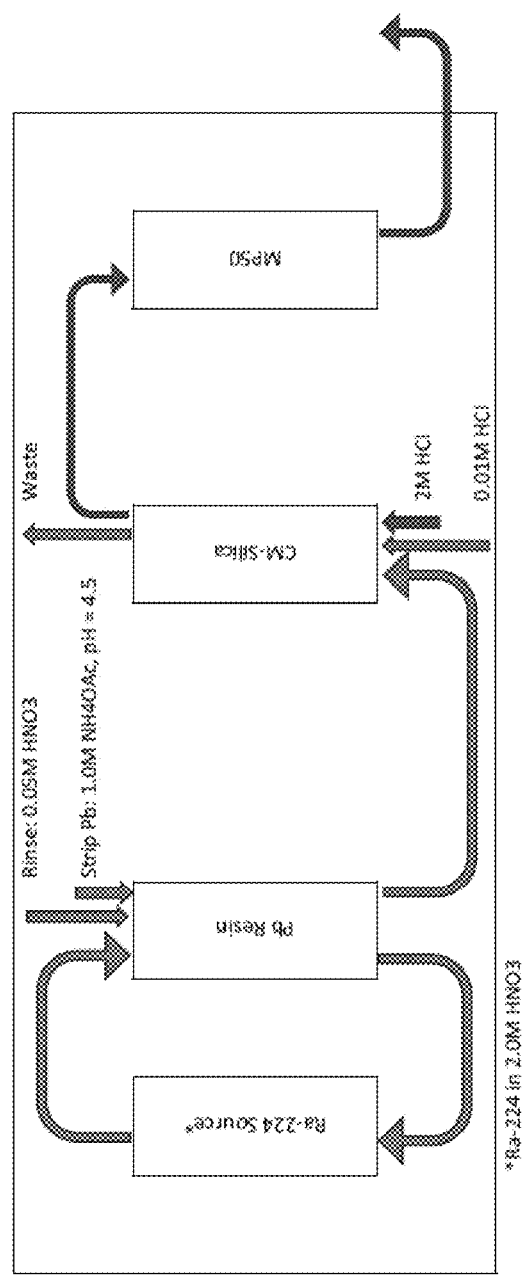
FIG. 7. is a flowchart illustrating steps for separating Pb-212 from a liquid source of Ra-224 as performed according to Example 3 herein.

FIG. 7 illustrates an embodiment of a flow schematic for the separation of Pb-212 from a liquid source of Ra-224, as used in this Example 3. The flow and parameters for Example were similar to Example 1, except that the volumes of the load solutions and rinse solutions have been optimized to maximize Pb recovery, Ra recovery, and Pb purity.

According to this example, an elution scheme utilized the following columns:

Primary Column (PC): 1 ML Pb Resin, 50-100 μm, precondition 10 mL 2.0M HNO3

Secondary Column (SC): HML CM-Silica, 20-45 μm, precondition 10 mL 1.0 M ammonium acetate, pH 4.5

Third Column/Guard Column (GC): QML MP50, 75-150 μm

The steps in the elution scheme were as follows:
1) Load Ra-224 source in 2.0M HNO₃ onto PC. Collect Ra-224 in same source vessel. (Initial source volumes: Source A=24 mL; Source B=58 mL; Source C=87 mL, volume increases 1 mL after each cycle)
2) Rinse PC with 1.0 mL of 0.1 M HNO₃ into Ra-224 source.
3) Remove Ra-224 source vessel. Place PC waste vial below PC.
4) Rinse PC with 9.0 mL of 0.1 M HNO₃. Collect in PC waste vial.
5) Remove PC waste vial.
6) Add SC below PC.
7) Add SC waste vial below columns.
8) Transfer Pb-212 from PC to SC with 15 mL of 1.0 M ammonium acetate, pH 4.5. Collect eluate in SC waste vial.
9) Remove PC.
10) Rinse SC with 10 mL of 0.01M HCl. Collect in SC waste vial.
11) Remove SC waste vial.
12) Add Pb-212 vial.
13) Add GC below SC.
14) Recover Pb-212 from SC through GC into Pb-212 vial with 4.0 mL of 2.0 M HCl.

Figure 8B:
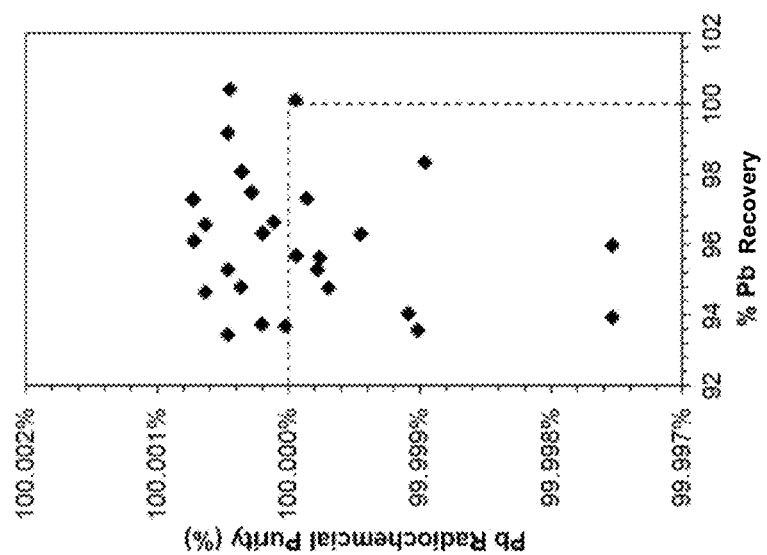
FIGS. 8a and 8b are plots showing the % Pb breakthrough and the radiochemical purity of the Pb-212 product as a function of % Pb, according to Example 3.
Figure 8A:
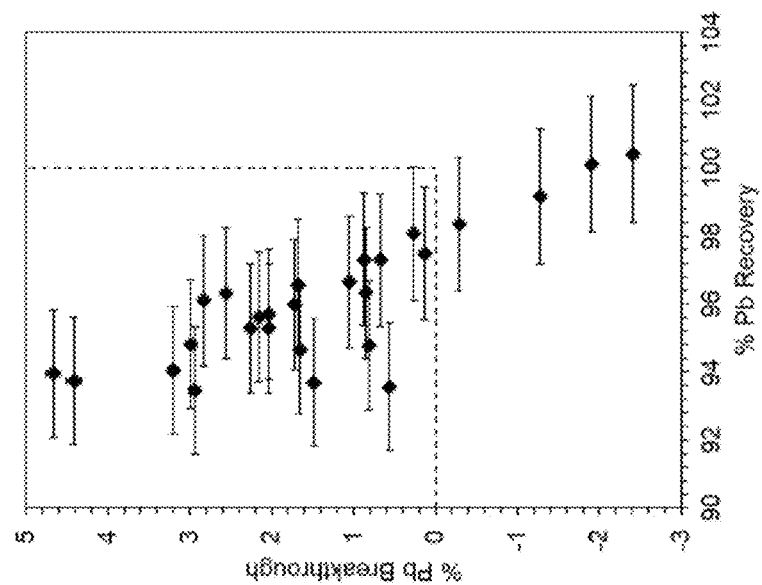

FIGS. 8a-8b show the % Pb breakthrough and the radiochemical purity of the Pb-212 product as a function of the % Pb recovery in Example 3.

Enumerated Embodiments

Aspects of the present disclosure include the following enumerated embodiments. The embodiments of the disclosure are not limited to those enumerated below.

Embodiment 1. A method for separating a lead radioisotope from a mixture comprising the lead radioisotope and a radioisotope of radium or thorium, the method comprising:
(a) loading a first cartridge with a first loading solution comprising the mixture, the first cartridge containing a first chromatographic media comprising lead-complexing media that preferentially binds the lead radioisotope over radioisotopes of radium and thorium in the presence of the first loading solution, whereby the lead radioisotope is bound to the lead-complexing media and is separated from the first loading solution;
(b) eluting the bound lead radioisotope from the first cartridge with a first eluent, to form a first eluate comprising the lead radioisotope dissolved in the first eluate;
(c) loading a second cartridge with a second loading solution comprising the first eluate, the second cartridge having a second chromatographic media comprising a weak cationic exchange media that preferentially binds the lead radioisotope over radioisotopes of radium and thorium in the presence of the second loading solution, whereby the lead radioisotope is bound to the weak cationic exchange media and separated from the second loading solution, and
(d) eluting the lead radioisotope from the second cartridge with a second eluent to form a second eluate comprising the lead radioisotope dissolved in the second eluate, wherein the second loading solution has a pH, $pH^{2L}$, the second eluent has a pH, $pH^{2E}$, and $pH^{2L}$ is greater than $pH^{2E}$.

Embodiment 2. The method according to Embodiment 1, wherein first loading solution that passes through the first cartridge is either treated and recycled back to the first cartridge to further bind lead isotope to the lead-complexing media, or is disposed of.

Embodiment 3. The method according to any of Embodiments 1-2, wherein second loading solution that passes through the second cartridge is either recycled back to the first cartridge to further bind lead isotope to the lead-complexing media, is treated and recycled back to the second cartridge to further bind lead isotope to the weak cationic exchange media, or is disposed of.

Embodiment 4. The method according to any of Embodiments 1-3, wherein the first loading solution has a pH, $pH^{1L}$, and the first eluent has a pH, $pH^{1E}$, and $pH^{1E}$ is greater than $pH^{1L}$.

Embodiment 5. The method according to any of Embodiments 1-4, further comprising:
(e) loading a third cartridge with a third loading solution comprising the second eluate, the third cartridge having a third chromatographic media comprising a strong cationic exchange media that preferentially binds radioisotopes of radium or thorium over the lead radioisotope in the presence of the third loading solution, thereby separating the radioisotope of radium or thorium from the third loading solution, to form a third lead-containing solution having the lead radioisotope dissolved therein and having a reduced content of the radioisotope of radium or thorium as compared to a content of the radioisotope of radium or thorium in the second eluate.

Embodiment 6. The method according to Embodiment 5, wherein third lead-containing solution that is flowed from the third cartridge is optionally recycled back to the third cartridge to further reduce a content of radioisotopes of radium or thorium in the third lead-containing solution.

Embodiment 7. The method according to any of Embodiments 5-6, further comprising:
(f) loading a fourth cartridge with a fourth loading solution comprising the third lead-containing solution, the fourth cartridge having a fourth chromatographic media comprising lead-complexing media that preferentially binds the lead radioisotope over radioisotopes of radium and thorium in the presence of the fourth loading solution, thereby separating the lead radioisotope from the fourth loading solution; and
(g) eluting the bound lead radioisotope from the fourth cartridge with a fourth eluent, to form a fourth eluate comprising the lead radioisotope dissolved in the fourth eluate.

Embodiment 8. The method according to Embodiment 7, wherein fourth loading solution that passes through the fourth cartridge is either treated and recycled back to the first cartridge or the fourth cartridge to further separate lead isotope therefrom, is recycled back to the second cartridge to further separate lead isotope therefrom, or is disposed of.

Embodiment 9. The method according to any of Embodiments 7-8, wherein the fourth loading solution has a pH, $pH^{4L}$, and the fourth eluent has a pH, $pH^{4E}$, and $pH^4$ is greater than $pH^{4L}$.

Embodiment 10. The method according to any preceding Embodiment, wherein the first cartridge comprises a type of lead-complexing media that is the same as a type of the lead-complexing media in the fourth cartridge.

Embodiment 11. The method according to any preceding Embodiment, wherein the lead comprises lead-212 or lead 203.

Embodiment 12. The method according to any preceding Embodiment, wherein radium is present in the form of radium-224 or radium-223.

Embodiment 13. The method according to any preceding Embodiment, wherein thorium is present in the form of thorium-228 or thorium 232.

Embodiment 14. The method according to any preceding Embodiment, wherein either or both of the first cartridge and the fourth cartridge comprise lead-complexing media that is ionically neutral media.

Embodiment 15. The method according to any preceding Embodiment, wherein either or both of the first cartridge and the fourth cartridge comprise lead-complexing media including any one of more of a diglycolamide-complexing moiety and a crown ether-complexing moiety.

Embodiment 16. The method according to any preceding Embodiment, wherein either or both of the first cartridge and the fourth cartridge comprise lead-complexing media comprising any one or more of 4,4'(5')-di-t-butylcyclohexano 18-crown-6 in isodecanol, 4,4'(5')-di-t-butylcyclohexano 18-crown-6 (diluent: 1-octanol), and N,N,N',N' tetra-alkyl-diglycoamide, where alkyl=the same or different linear or branched alkyl group having 2-12 carbon atoms.

Embodiment 17. The method according to any preceding Embodiment, wherein the second cartridge comprises weak cationic exchange media comprising carboxyalkyl ionizable groups bound to a silica-based support.

Embodiment 18. The method according to any preceding Embodiment, wherein the second cartridge comprises carboxymethyl functional groups bound to a silica-based support.

Embodiment 19. The method according to any preceding Embodiment, wherein the third cartridge comprises strong cationic exchange media comprising sulfonic acid groups.

Embodiment 20. The method according to any preceding Embodiment, wherein the third cartridge comprises strong cationic exchange media comprising sulfonic acid groups bound to divinyl benzene.

Embodiment 21. The method according to any preceding Embodiment, wherein the first loading solution comprises mineral acid.

Embodiment 22. The method according to Embodiment 21, wherein the mineral acid present in the first loading solution comprises any of $HNO_3$, HCl, HBr, HI and $H_2SO_4$.

Embodiment 23. The method according to any of Embodiments 21-22, wherein the concentration of mineral acid in the first solution is in the range of 0.1-10 M, 0.1-8 M, 0.2-8 M, 0.5-5 M, 1-4 M, 1-3 M, and/or about 2M.

Embodiment 24. The method according to any preceding Embodiment, wherein the first eluent comprises weak acid.

Embodiment 25. The method according to Embodiment 24, wherein the first eluent comprising the weak acid comprises a pH in the range of from 1 to 5.5, 2-5, 3-5, 4-5, and and/or 4.5.

Embodiment 26. The method according to any of Embodiments 24-25, wherein the weak acid comprises any of carboxylate groups, sulfate groups, or phosphate groups.

Embodiment 27. The method according to any of Embodiments 24-26, wherein the weak acid comprises a salt of any one or more of acetate, citrate, and oxalate.

Embodiment 28. The method according to any of Embodiments 24-27, wherein the weak acid comprises ammonium acetate.

Embodiment 29. The method according to any of Embodiments 20-28, wherein the weak acid comprises a concentration of from 0.1 to 2.0 M, from 0.5-1.5 M, from 0.75-1.25 M, and/or about 1 M.

Embodiment 30. The method according to any preceding Embodiment, wherein the first eluent comprises dilute mineral acid having a concentration no more than 0.1 M.

Embodiment 31. The method according to Embodiment 30, wherein the first eluent comprises dilute mineral acid comprising any of $HNO_3$, HCl, HBr, HI and $H_2SO_4$.

Embodiment 32. The method according to any of Embodiments 30-31, wherein the first eluent comprises dilute mineral acid having a concentration no more than 0.1M, 0.001-0.1, and/or 0.01-0.1 M.

Embodiment 33. The method according to any preceding Embodiment, wherein the second loading solution is the first eluate.

Embodiment 34. The method according to any preceding Embodiment, wherein the first eluate is flowed without modification from the first cartridge to the second cartridge.

Embodiment 35. The method according to any of Embodiment 1-33, wherein the first eluate is modified to form the second loading solution before loading onto the second cartridge.

Embodiment 36. The method according to any preceding Embodiment, wherein the second loading solution comprises weak acid.

Embodiment 37. The method according to Embodiment 36, wherein the second loading solution comprising the weak acid comprises a pH in the range of from 1 to 5.5, 2-5, 3-5, 4-5, and and/or 4.5.

Embodiment 38. The method according to any of Embodiments 36-37, wherein the weak acid comprises any of carboxylate groups, sulfate groups, or phosphate groups.

Embodiment 39. The method according to any of Embodiments 36-38, wherein the weak acid comprises a salt of any one or more of acetate, citrate, and oxalate.

Embodiment 40. The method according to any of Embodiments 36-39, wherein the weak acid comprises ammonium acetate.

Embodiment 41. The method according to any of Embodiments 36-40, wherein the weak acid comprises a concentration of from 0.1 to 2.0 M, from 0.5-1.5 M, from 0.75-1.25 M, and/or about 1 M.

Embodiment 42. The method according to any preceding Embodiment, wherein the second loading solution comprises dilute mineral acid having a concentration no more than 0.1 M.

Embodiment 43. The method according to Embodiment 42, wherein the second loading solution comprises dilute mineral acid comprising any of $HNO_3$, HCl, HBr, HI and $H_2SO_4$.

Embodiment 44. The method according to any of Embodiments 42-43, wherein the second loading solution comprises dilute mineral acid having a concentration in the range of from a concentration no more than 0.1 M, 0.001-0.1 M, and/or 0.01-0.1 M.

Embodiment 45. The method according to any preceding Embodiment, wherein the second eluent comprises mineral acid.

Embodiment 46. The method according to Embodiment 45, wherein the second eluent comprises any of $HNO_3$, HCl, HBr, HI and $H_2SO_4$.

Embodiment 47. The method according to any of Embodiments 45-46, wherein the second eluent comprises mineral acid in a concentration of from 0.01 to 5 M, 0.02-4 M, 0.02-3 M, and/or 0.02-2 M.

Embodiment 48. The method according to any of Embodiments 45-47, wherein the second eluent comprises mineral acid in a concentration sufficient to form an anionic form of lead in the second eluent.

Embodiment 49. The method according to any of Embodiments 45-48, wherein the anionic form of lead comprises $PbCl4^2$.

Embodiment 50. The method according to any of Embodiments 45-49, wherein the second eluent comprises mineral acid corresponding to HCl.

Embodiment 51. The method according to any preceding Embodiment, wherein the third loading solution is the second eluate.

Embodiment 52. The method according to any preceding Embodiment, wherein the second eluate is flowed without modification from the second cartridge to the third cartridge.

Embodiment 53. The method according to any of Embodiments 1-50, wherein the second eluate is modified to form the thirds loading solution before loading onto the third cartridge.

Embodiment 54. The method according to any preceding Embodiment, wherein the third loading solution comprises mineral acid.

Embodiment 55. The method according to Embodiment 54, wherein the third loading solution comprises any of $HNO_3$, HCl, HBr, HI and $H_2SO_4$.

Embodiment 56. The method according to any of Embodiments 54-55, wherein the third loading solution comprises mineral acid in a concentration of from 0.01 to 5 M, 0.02-4 M, 0.02-3 M, and/or 0.02-2 M.

Embodiment 57. The method according to any of Embodiments 54-56, wherein the third loading solution comprises mineral acid in a concentration sufficient to form an anionic form of lead in the third loading solution.

Embodiment 58. The method according to any of Embodiments 54-57, wherein the anionic form of lead comprises $PbCl4^2$.

Embodiment 59. The method according to any of Embodiments 54-58, wherein the third loading solution comprises mineral acid corresponding to HCl.

Embodiment 60. The method according to any preceding Embodiment, wherein the third lead-containing solution corresponds to the third loading solution as passed through the third cartridge, and with a reduced content of the isotope of radium or thorium as compared to the third loading solution.

Embodiment 61. The method according to any preceding Embodiment, wherein the fourth loading solution is the third lead-containing solution.

Embodiment 62. The method according to any preceding Embodiment, wherein the third lead-containing solution is flowed without modification from the third cartridge to the fourth cartridge.

Embodiment 63. The method according to any of Embodiments 1-61, wherein the third lead-containing solution is modified to form the fourth loading solution before loading onto the fourth cartridge.

Embodiment 64. The method according to any preceding Embodiment, wherein the fourth loading solution comprises mineral acid.

Embodiment 65. The method according to Embodiment 64, wherein the fourth loading solution comprises any of $HNO_3$, HCl, HBr, HI and $H_2SO_4$.

Embodiment 66. The method according to any of Embodiments 64-65, wherein the fourth loading solution comprises mineral acid in a concentration of from 0.01 to 5 M, 0.02-4 M, 0.02-3 M, and/or 0.02-2 M.

Embodiment 67. The method according to any of Embodiments 64-66, wherein the fourth loading solution comprises mineral acid corresponding to HCl.

Embodiment 68. The method according to any preceding Embodiment, wherein the fourth eluent comprises weak acid.

Embodiment 69. The method according to Embodiment 68, wherein the fourth eluent comprising the weak acid comprises a pH in the range of from 1 to 5.5, 2-5, 3-5, 4-5, and and/or 4.5.

Embodiment 70. The method according to any of Embodiments 68-69, wherein the weak acid comprises any of carboxylate groups, sulfate groups, or phosphate groups.

Embodiment 71. The method according to any of Embodiments 68-70, wherein the weak acid comprises a salt of any one or more of acetate, citrate, and oxalate.

Embodiment 72. The method according to any of Embodiments 68-71, wherein the weak acid comprises ammonium acetate.

Embodiment 73. The method according to any of Embodiments 68-72, wherein the weak acid comprises a concentration of from 0.1 to 2.0 M, from 0.5-1.5 M, from 0.75-1.25 M, and/or about 1 M.

Embodiment 74. The method according to any preceding Embodiment, wherein the fourth eluent comprises dilute mineral acid having a concentration no more than 0.1 M.

Embodiment 75. The method according to Embodiment 74, wherein the fourth eluent comprises dilute mineral acid comprising any of $HNO_3$, HCl, HBr, HI and $H_2SO_4$.

Embodiment 76. The method according to any of Embodiments 74-75, wherein the fourth eluent comprises dilute mineral acid having a concentration in the range of from a concentration no more than 0.1M, 0.001-0.1 M, and/or 0.01-0.1 M.

Embodiment 77. The method according to any preceding Embodiment, comprising rinsing any one or more of the lead complexing media in the first cartridge, the lead complexing media in the fourth cartridge, and the weak cationic exchange media in the second cartridge, with a rinsing solution, to further elute one or more of radium or thorium.

Embodiment 78. The method according to any preceding Embodiment, wherein comprising rinsing the strong cationic exchange media in the third cartridge, with a rinsing solution, to further elute lead.

Embodiment 79. The method according to any preceding claim, further comprising:

(g) loading a third cartridge with a third loading solution comprising the first eluate, the third cartridge having third chromatographic media comprising a strong cationic exchange media that preferentially binds radioisotopes of radium or thorium over the lead radioisotope in the presence of the loading solution, thereby separating the radioisotope of radium or thorium from the third loading solution, to form a third lead-containing solution having the lead radioisotope dissolved therein and having a reduced content of the radioisotope of radium or thorium as compared to a content of the radioisotope of radium or thorium in the first eluate, and (h) providing the third lead-containing solution to the second cartridge as the second loading solution.

Embodiment 80. The method according to Embodiment 79, further comprising:

(i) loading a fourth cartridge with a fourth loading solution comprising the second eluate, the fourth cartridge having a fourth chromatographic media comprising lead-complexing media that preferentially binds the lead radioisotope over radioisotopes of radium and thorium in the presence of the fourth loading solution, thereby separating the lead radioisotope from the fourth loading solution; and (j) eluting the bound lead radioisotope from the fourth cartridge with a fourth eluent, to form a fourth eluate comprising the lead radioisotope dissolved in the fourth eluate.

Embodiment 81. An aqueous solution of lead radioisotope obtained by the method of any of the preceding Embodiments.

Embodiment 82. A method of manufacturing a radiopharmaceutical comprising introducing an unchelated radiopharmaceutical to an aqueous solution comprising the fourth eluate to form a lead-chelated radiopharmaceutical.

Embodiment 83. A radiopharmaceutical prepared according to the method of Embodiment 82.

Embodiment 84. A system for separating a lead radioisotope from a mixture comprising lead radioisotope and a radium isotope or a thorium isotope, the system comprising a first and a second cartridge in series with one another, each of the first and second cartridges having an inlet, an outlet and a chamber therebetween containing chromatographic media, wherein (a) the first cartridge chamber contains a first chromatographic media comprising lead-complexing media that (i) preferentially binds the lead radioisotope over radioisotopes of radium and thorium in the presence of a first loading solution containing the mixture, thereby separating the lead radioisotope from the first loading solution, and (ii) elutes the lead radioisotope in the presence of a first eluent to form a first eluate comprising the lead radioisotope dissolved in the second solution;

(b) the second cartridge chamber contains a second chromatographic media comprising a weak cationic exchange media that (i) preferentially binds the lead radioisotope over radioisotopes of radium and thorium from a second loading solution comprising the first eluate, thereby separating the lead radioisotope from the second loading solution, and (ii) elutes the lead radioisotope in the presence of a second eluent to form a second eluate comprising the lead radioisotope dissolved in the second eluate, wherein the second loading solution has a pH, $pH^{2L}$, the second eluent has a pH, $pH^{2E}$, and $pH^{2L}$ is greater than $pH^{2E}$.

Embodiment 85. The system according to Embodiment 84, wherein the first loading solution has a pH, $pH^{1L}$, and the first eluent has a pH, $pH^{1E}$, and $pH^{1E}$ is greater than $pH^{1L}$.

Embodiment 86. The system according to any of Embodiments 84-85, further comprising:

(c) a third cartridge in series with the first and second cartridges, the third cartridge having an inlet, an outlet and a chamber therebetween containing chromatographic media, wherein the third cartridge chamber has chromatographic media comprising strong cationic exchange media that (i) preferentially binds radioisotopes of radium or thorium over the lead radioisotope in the presence of a third loading solution containing the second eluate, thereby separating the radioisotope of radium or thorium from the third loading solution, and (ii) passes through the lead radioisotope in the third loading solution to form a third lead-containing solution having the lead radioisotope dissolved therein and having a reduced content of the radioisotope of radium or thorium as compared to a content of the radioisotope of radium or thorium in the second eluate.

Embodiment 87. The system according to Embodiment 86, further comprising:

(d) a fourth cartridge in series with the first, second, and third cartridges, the fourth cartridge having an inlet, an outlet and a chamber therebetween containing chromatographic media, wherein the fourth cartridge chamber has chromatographic media comprising lead-complexing media that (i) preferentially binds the lead radioisotope over radioisotopes of radium and thorium in the presence of a fourth loading solution comprising the third lead-containing solution, thereby separating the lead radioisotope from the fourth loading solution, and (ii) elutes the lead radioisotope in the presence of a fourth eluent introduced to the lead-complexing media to form a fourth eluate comprising the lead radioisotope dissolved in the fourth eluate.

Embodiment 88. The system according to Embodiment 87, wherein the fourth loading solution has a pH, $pH^{4L}$, and the fourth eluent has a pH, $pH^{4E}$, and $pH^{4E}$ is greater than $pH^{4L}$.

Embodiment 89. The system according to any of Embodiments 87-88, wherein the first cartridge comprises a type of lead-complexing media that is the same as a type of the lead-complexing media in the fourth cartridge.

Embodiment 90. The system according to any preceding Embodiment, wherein the lead comprises lead-212 or lead 203.

Embodiment 91. The system according to any preceding Embodiment, wherein radium is present in the form of radium-224 or radium-223.

Embodiment 92. The system according to any preceding Embodiment, wherein thorium is present in the form of thorium-228 or thorium 232.

Embodiment 93. The system according to any preceding Embodiment, wherein either or both of the first cartridge and the fourth cartridge comprise lead-complexing media that is ionically neutral media.

Embodiment 94. The system according to any preceding Embodiment, wherein either or both of the first cartridge and the fourth cartridge comprise lead-complexing media including any one of more of a diglycolamide-complexing moiety and a crown ether-complexing moiety.

Embodiment 95. The system according to any preceding Embodiment, wherein either or both of the first cartridge and the fourth cartridge comprise lead-complexing media comprising any one or more of 4,4'(5')-di-t-butylcyclohexano 18-crown-6 in isodecanol, 4,4'(5')-di-t-butylcyclohexano 18-crown-6 (diluent: 1-octanol), and N,N,N',N' tetra-alkyl-diglycoamide, where alkyl=the same or different linear or branched alkyl group having 2-12 carbon atoms.

Embodiment 96. The system according to any preceding Embodiment, wherein the second cartridge comprises weak cationic exchange media comprising carboxyalkyl ionizable groups bound to a silica-based support.

Embodiment 97. The system according to any preceding Embodiment, wherein the second cartridge comprises weak cationic exchange media comprising carboxymethyl functional groups bound to a silica-based support.

Embodiment 98. The system according to any preceding Embodiment, wherein the third cartridge comprises strong cationic exchange media comprising sulfonic acid groups.

Embodiment 99. The system according to any preceding Embodiment, wherein the third cartridge comprises strong cationic exchange media sulfonic acid groups bound to divinyl benzene.

Embodiment 100. The system according to any preceding Embodiment, wherein the lead-complexing media preferentially binds lead radioisotope in the presence of first loading solution comprising mineral acid.

Embodiment 101. The system according to Embodiment 100, wherein the lead-complexing media preferentially binds lead radioisotope in the presence of the mineral acid comprising any of $HNO_3$, HCl, HBr, HI and $H_2SO_4$.

Embodiment 102. The system according to any of Embodiments 100-101, wherein the lead-complexing media preferentially binds lead radioisotope in the presence of mineral acid having a concentration of 0.1-10 M, 0.1-8 M, 0.2-8 M, 0.5-5 M, 1-4 M, 1-3 M, and/or about 2M.

Embodiment 103. The system according to any preceding Embodiment, wherein the lead-complexing media elutes lead radioisotope in the presence of first eluent comprising weak acid.

Embodiment 104. The system according to Embodiment 103, wherein the lead-complexing media elutes lead radioisotope in the presence of weak acid comprising a pH in the range of from 1 to 5.5, 2-5, 3-5, 4-5, and and/or 4.5.

Embodiment 105. The system according to any of Embodiments 103-104, wherein the lead-complexing media elutes lead radioisotope in the presence of the weak acid comprising any of carboxylate groups, sulfate groups, or phosphate groups.

Embodiment 106. The system according to any of Embodiments 103-105, wherein the lead-complexing media elutes lead radioisotope in the presence of the weak acid that comprises a salt of any one or more of acetate, citrate, and oxalate.

Embodiment 107. The system according to any of Embodiments 103-106, wherein the lead-complexing media elutes lead radioisotope in the presence of weak acid comprising ammonium acetate.

Embodiment 108. The system according to any of Embodiments 103-107, wherein the lead-complexing media elutes lead radioisotope in the presence of weak acid comprises a concentration of from 0.1 to 2.0 M, from 0.5-1.5 M, from 0.75-1.25 M, and/or about 1 M.

Embodiment 109. The system according to any preceding Embodiment, wherein the lead-complexing medial elutes lead radioisotope in the presence of first eluent comprising dilute mineral acid having a concentration of no more than 0.1 M.

Embodiment 110. The system according to Embodiment 109, wherein the lead-complexing medial elutes lead radioisotope in the presence of dilute mineral acid comprising any of $HNO_3$, HCl, HBr, HI and $H_2SO_4$.

Embodiment 111. The system according to any of Embodiments 109-110, wherein the lead-complexing media elutes lead radioisotope in the presence of first eluent comprising dilute mineral acid having a concentration in the range of from a concentration no more than 0.1M, 0.001-0.1 M, and/or 0.01-0.1 M.

Embodiment 112. The system according to any preceding Embodiment, wherein the weak cationic ion exchange media preferentially binds lead radioisotope in the presence of second loading solution that corresponds to the first eluent.

Embodiment 113. The system according to any preceding Embodiment, wherein the weak cationic ion exchange media preferentially binds lead radioisotope in the presence of second loading solution corresponding to first eluent that is flowed without modification from the first cartridge to the second cartridge.

Embodiment 114. The system according to any of Embodiments 84-112, wherein the weak cationic ion exchange media preferentially binds lead radioisotope in the presence of second loading solution that corresponds to first eluent that has been modified to form the second loading solution before loading onto the second cartridge.

Embodiment 115. The system according to any preceding Embodiment, wherein the weak cationic ion exchange media preferentially binds lead radioisotope in the presence of second loading solution comprising weak acid.

Embodiment 116. The system according to Embodiment 115, wherein the weak cationic ion exchange media preferentially binds lead radioisotope in the presence of second loading solution comprising weak acid comprises a pH in the range of from 1 to 5.5, 2-5, 3-5, 4-5, and and/or 4.5.

Embodiment 117. The system according to any of Embodiments 115-116, wherein the weak cationic ion exchange media preferentially binds lead radioisotope in the presence of weak acid comprising any of carboxylate groups, sulfate groups, or phosphate groups.

Embodiment 118. The system according to any of Embodiments 115-117, wherein the weak cationic ion exchange media preferentially binds lead radioisotope in the presence of weak acid comprising a salt of any one or more of acetate, citrate, and oxalate.

Embodiment 119. The system according to any of Embodiments 115-118, wherein the weak cationic ion exchange media preferentially binds lead radioisotope in the presence of weak acid comprising ammonium acetate.

Embodiment 120. The system according to any of Embodiments 115-119, wherein the weak cationic ion exchange media preferentially binds lead radioisotope in the presence of weak acid comprising a concentration of from 0.1 to 2.0 M, from 0.5-1.5 M, from 0.75-1.25 M, and/or about 1 M.

Embodiment 121. The system according to any preceding Embodiment, wherein the weak cationic ion exchange media preferentially binds lead radioisotope in the presence of the second loading solution comprising dilute mineral acid having a concentration no more than 0.1 M.

Embodiment 122. The system according to Embodiment 121, wherein the weak cationic ion exchange media preferentially binds lead radioisotope in the presence of second loading solution comprising dilute mineral acid comprising any of $HNO_3$, HCl, HBr, HI and $H_2SO_4$ Embodiment 123. The system according to any of Embodiments 121-122, wherein the weak cationic ion exchange media preferentially binds lead radioisotope in the presence of second loading solution comprising dilute mineral acid having a concentration in the range of no more than 0.1 M, 0.001-0.1 M, and/or 0.01-0.1 M.

Embodiment 124. The system according to any preceding Embodiment, wherein the weak cationic ion exchange media elutes lead radioisotope in the presence of second eluent comprising mineral acid.

Embodiment 125. The system according to Embodiment 124, wherein the weak cationic ion exchange media elutes lead radioisotope in the presence of second eluent comprising any of $HNO_3$, HCl, HBr, HI and $H_2SO_4$.

Embodiment 126. The system according to any of Embodiments 124-125, wherein the weak cationic ion exchange media elutes lead radioisotope in the presence of second eluent comprising mineral acid in a concentration of from 0.01 to 5 M, 0.02-4 M, 0.02-3 M, and/or 0.02-2 M.

Embodiment 127. The system according to any of Embodiments 124-126, wherein the weak cationic ion exchange media elutes lead radioisotope in the presence of second eluent comprising mineral acid in a concentration sufficient to form an anionic form of lead in the second eluent.

Embodiment 128. The system according to any of Embodiments 124-127, wherein the anionic form of lead comprises $PbCl4^2$.

Embodiment 129. The system according to any of Embodiments 124-128, wherein the weak cationic ion exchange media elutes lead radioisotope in the presence of second eluent comprising mineral acid corresponding to HCl.

Embodiment 130. The system according to any preceding Embodiment, wherein the strong cationic exchange resin preferentially binds radioisotopes of radium and thorium in third loading solution that corresponds to the second eluent.

Embodiment 131. The system according to any preceding Embodiment, wherein the strong cationic exchange resin preferentially binds radioisotopes of radium and thorium in second eluent that is flowed without modification from the second cartridge to the third cartridge.

Embodiment 132. The system according to any of Embodiments 84-129, wherein the strong cationic exchange resin preferentially binds radioisotopes of radium and thorium in second eluent that is modified to form the third loading solution before loading onto the third cartridge.

Embodiment 133. The system according to any preceding Embodiment, wherein the strong cationic exchange resin preferentially binds radioisotopes of radium and thorium in the presence of third loading solution comprising mineral acid.

Embodiment 134. The system according to Embodiment 133, wherein the strong cationic exchange resin preferentially binds radioisotopes of radium and thorium in the presence of the third loading solution comprising any of $HNO_3$, HCl, HBr, HI and $H_2SO_4$.

Embodiment 135. The system according to any of Embodiments 133-134, wherein the strong cationic exchange resin preferentially binds radioisotopes of radium and thorium in the presence of third loading solution comprising mineral acid in a concentration of from 0.01 to 5 M, 0.02-4 M, 0.02-3 M, and/or 0.02-2 M.

Embodiment 136. The system according to any of Embodiments 133-135, wherein the strong cationic exchange resin preferentially binds radioisotopes of radium and thorium in the presence of third loading solution comprising mineral acid in a concentration sufficient to form an anionic form of lead in the third loading solution.

Embodiment 137. The system according to any of Embodiments 133-136, wherein the anionic form of lead comprises $PbCl4^2$.

Embodiment 138. The system according to any of Embodiments 133-137, wherein the strong cationic exchange resin preferentially binds radioisotopes of radium and thorium in the presence of third loading solution comprising mineral acid corresponding to HCl.

Embodiment 139. The system according to any preceding Embodiment, wherein the lead complexing resin of the fourth cartridge preferentially binds lead radioisotope in the presence of third lead-containing solution that is flowed directly from the third cartridge to the fourth cartridge.

Embodiment 140. The system according to any preceding Embodiment, wherein system comprises a conduit configured to flow the third lead-containing solution directly to the fourth cartridge.

Embodiment 141. The system according to any preceding Embodiment, wherein the lead complexing resin of the fourth cartridge preferentially binds lead radioisotope in the presence of third lead-containing solution that is flowed without modification from the third cartridge to the fourth cartridge.

Embodiment 142. The system according to any of Embodiments 84-140, wherein the lead complexing resin of the fourth cartridge preferentially binds lead radioisotope in the presence of third lead-containing solution that is modified to form the fourth loading solution before loading onto the fourth cartridge.

Embodiment 143. The system according to any preceding Embodiment, wherein the lead complexing media of the fourth cartridge preferentially binds lead radioisotope in the presence of fourth loading solution comprising mineral acid.

Embodiment 144. The system according to Embodiment 143, wherein the lead complexing media of the fourth cartridge preferentially binds lead radioisotope in the presence of the fourth loading solution comprising any of $HNO_3$, HCl, HBr, HI and $H_2SO_4$.

Embodiment 145. The system according to any of Embodiments 143-144, wherein the lead complexing media of the fourth cartridge preferentially binds lead radioisotope in the presence of fourth loading solution comprising mineral acid in a concentration of from 0.01 to 5 M, 0.02-4 M, 0.02-3 M, and/or 0.02-2 M.

Embodiment 146. The system according to any of Embodiments 143-145, wherein the lead complexing media of the fourth cartridge preferentially binds lead radioisotope in the presence of fourth loading solution comprising mineral acid corresponding to HCl.

Embodiment 147. The system according to any preceding Embodiment, wherein the lead complexing media of the fourth cartridge preferentially binds lead radioisotope in the presence of fourth eluent comprising weak acid.

Embodiment 148. The system according to Embodiment 147, wherein the lead complexing media of the fourth cartridge preferentially binds lead radioisotope in the presence of fourth eluent comprising weak acid having a pH in the range of from 0.1 to 2.0 M, from 0.5-1.5 M, from 0.75-1.25 M, and/or about 1 M.

Embodiment 149. The system according to any of Embodiments 147-148, wherein the lead complexing media of the fourth cartridge preferentially binds lead radioisotope in the presence of weak acid comprising any of carboxylate groups, sulfate groups, or phosphate groups.

Embodiment 150. The system according to any of Embodiments 147-149, wherein the lead complexing media of the fourth cartridge preferentially binds lead radioisotope in the presence of weak acid comprising a salt of any one or more of acetate, citrate, and oxalate.

Embodiment 151. The system according to any of Embodiments 147-150, wherein the lead complexing media of the fourth cartridge preferentially binds lead radioisotope in the presence of weak acid comprising ammonium acetate.

Embodiment 152. The system according to any of Embodiments 147-151, wherein the lead complexing media of the fourth cartridge preferentially binds lead radioisotope in the presence of weak acid comprising a concentration of from 0.1 to 2.0 M, from 0.5-1.5 M, from 0.75-1.25 M, and/or about 1 M.

Embodiment 153. The system according to any preceding Embodiment, wherein the lead complexing media of the fourth cartridge elutes lead radioisotope in the presence of fourth eluent comprising dilute mineral acid having a concentration no more than 0.1 M.

Embodiment 154. The system according to Embodiment 153, wherein the lead complexing media of the fourth cartridge elutes lead radioisotope in the presence of fourth eluent comprising dilute mineral acid comprising any of $HNO_3$, HCl, HBr, HI and $H_2SO_4$.

Embodiment 155. The system according to any of Embodiments 153-154, wherein the lead complexing media of the fourth cartridge elutes lead radioisotope in the presence of fourth eluent comprises dilute mineral acid having a concentration of no more than 0.1 M, 0.001-0.1 M, and/or 0.01-0.1 M Embodiment 156. The system according to any preceding Embodiment, wherein the system is configured to accommodate comprising rinsing any one or more of the lead complexing media in the first cartridge, the lead complexing media in the fourth cartridge, and the weak cationic exchange media in the second cartridge, with a rinsing solution, to further elute one or more of radium or thorium.

Embodiment 157. The system according to any preceding Embodiment, wherein the system is configured to accommodate rinsing the strong cationic exchange media in the third cartridge, with a rinsing solution, to further elute lead.

Embodiment 158. The system according to any preceding Embodiment, comprising:

a third cartridge in series with the first and second cartridges, the third cartridge having an inlet, an outlet and a chamber therebetween containing chromatographic media, wherein the third cartridge chamber has chromatographic media comprising strong cationic exchange media that (i) preferentially binds radioisotopes of radium or thorium over the lead radioisotope in the presence of a third loading solution containing the first eluate, thereby separating the radioisotope of radium or thorium from the third loading solution, and (ii) passes through the lead radioisotope in the third loading solution to form a third lead-containing solution having the lead radioisotope dissolved therein and having a reduced content of the radioisotope of radium or thorium as compared to a content of the radioisotope of radium or thorium in the first eluate, wherein the second cartridge is configured to receive the third lead-containing solution at the second loading solution, and wherein the weak cationic exchange resin of the second cartridge preferentially binds lead isotope in the presence of the third lead-containing solution.

Embodiment 159. The system according to Embodiment 158, further comprising:

a fourth cartridge in series with the first, second, and third cartridges, the fourth cartridge having an inlet, an outlet and a chamber therebetween containing chromatographic media, wherein the fourth cartridge chamber has chromatographic media comprising lead-complexing media that (i) preferentially binds the lead radioisotope over radioisotopes of radium and thorium in the presence of a fourth loading solution comprising the second eluate, thereby separating the lead radioisotope from the fourth loading solution, and (ii) elutes the lead radioisotope in the presence of a fourth eluent introduced to the lead-complexing media to form a fourth eluate comprising the lead radioisotope dissolved in the fourth eluate.

LIST OF REFERENCES

[1] WO 2024/05018
[2] A Lead-Selective Extraction Chromatographic Resin and its Application to Isolation of Lead from Geological Samples, Horwitz et al., Analytica Chimica Acta 292 (1994) 263-273
[3] A Novel Strontium-Selective Extraction Chromatographic Resin, Horwitz et al, Solvent Extraction and Ion Exchange, Vol. 10 (No. 2) (1992).
[4] Optimized Production, Purification, and Radiolabeling of the 203Pb/2212Pb Theranostic Pair for Nuclear Medicine, McNeil et al., Nature Scientific Reports 13 (2023) 10623.
[5] Chromatographic Generator Systems for Actinides and Natural Decay Series Elements, McAlister et al., Radiochim. Acta 99 (2011) 151-159.
[6] Optimized Methods for the Production of High Purity 203Pb Using Electroplated Thallium Targets, Saini et al., J. Nucl. Med. 64 (2023) 1791-1797.

What is claimed is:

1. A system for separating a lead radioisotope from a mixture comprising lead radioisotope and a radium isotope or a thorium isotope, the system comprising a first, a second, a third and a fourth cartridge in series with one another, each of the first, second, third and fourth cartridges having an inlet, an outlet and a chamber therebetween containing chromatographic media, wherein (a) the first cartridge chamber contains a first chromatographic media comprising lead-complexing media that (i) preferentially binds the lead radioisotope over radioisotopes of radium and thorium in the presence of a first loading solution having a pH, $pH^{1L}$, and containing the mixture, and (ii) elutes the lead radioisotope in the presence of a first eluent comprising a weak acid and having a pH, $pH^{1E}$, to form a first eluate comprising the lead radioisotope dissolved in the first eluate, wherein $pH^{1E}$ is greater than $pH^{1L}$, (b) the second cartridge chamber contains a second chromatographic media comprising a weak cationic exchange media, the weak cationic exchange media comprising carboxylic acid and/or carboxylate groups, that (i) preferentially binds the lead radioisotope over radioisotopes of radium and thorium from a second loading solution comprising a weak acid and having a pH, $pH^{2L}$, and (ii) elutes the lead radioisotope in the presence of a second eluent comprising a mineral acid and having a pH, $pH^{2E}$, to form a second eluate comprising the lead radioisotope dissolved in the second eluate, wherein $pH^{2L}$ is greater than $pH^{2E}$, (c) the third cartridge chamber contains a third chromatographic media comprising a strong cationic exchange media, the strong cationic exchange media comprising sulfonic acid and/or sulfonate groups, that (i) preferentially binds radioisotopes of radium or thorium over the lead radioisotope in the presence of a third loading solution comprising a mineral acid and containing the second eluate, thereby separating the radioisotope of radium or thorium from the third loading solution, and (ii) passes through the lead radioisotope in the third loading solution to form a third lead-containing solution having the lead radioisotope dissolved therein and having a reduced content of the radioisotope of radium or thorium as compared to a content of the radioisotope of radium or thorium in the second eluate, and (d) the fourth cartridge chamber contains a fourth chromatographic media comprising lead-complexing media that (i) preferentially binds the lead radioisotope over radioisotopes of radium and thorium in the presence of a fourth loading solution having a pH, $pH^{4L}$, and (ii) elutes the lead radioisotope in the presence of a fourth eluent having a pH, $pH^{4E}$, wherein $pH^{4E}$ is greater than $pH^{4L}$, and (e) the outlet of the first cartridge is fluidly connected to the inlet of the second cartridge, such that the first eluate from the first cartridge flows directly into the second cartridge, and the outlet of the second cartridge is fluidly connected to the inlet of the third cartridge, such that the second eluate from the second cartridge flows directly into the third cartridge.

2. The system according to claim 1, wherein the first and fourth cartridges comprise the same lead-complexing media.

3. The system according to claim 1, wherein the lead radioisotope comprises lead-212.

4. The system according to claim 1, wherein the radium isotope is radium-224 or radium-223.

5. The system according to claim 1, wherein the thorium isotope is thorium-228 or thorium 232.

6. The system according to claim 1, wherein either or both of the first cartridge and the fourth cartridge comprise lead-complexing media that is ionically neutral media.

7. The system of claim 1 wherein the lead-complexing media of the first cartridge comprises a solid support impregnated with a solution comprising a crown-ether-complexing moiety.

8. The system of claim 7 wherein the crown-ether complexing moiety is a dicyclohexano-8-crown-6 or a dibenzo-18-crown-6 moiety wherein the cyclo-hexyl or benzyl groups are substituted by one or more straight-chain or branched $C_1$ to $C_{12}$ alkyl groups.

9. The system of claim 1 wherein the lead-complexing media of the first cartridge comprises a crown ether-complexing moiety selected from the group consisting of 4,4' (5')-di-t-butylcyclohexano 18-crown-6 diluted in isodecanol and 4,4'(5')-di-t-butylcyclohexano 18-crown-6 diluted in 1-octanol.

10. The system of claim 1 wherein the lead-complexing media of the first cartridge preferentially binds the lead radioisotope over radioisotopes of radium and thorium in the presence of a first loading solution containing a mineral acid in a concentration of 1-3 M.

11. The system of claim 1, wherein the lead-complexing media of the first cartridge elutes the lead radioisotope in the presence of the first eluent comprising the weak acid having a pH in the range of from 1 to 5.5, and wherein the weak acid comprises any of carboxylate groups, sulfate groups, or phosphate groups.

12. The system of claim 1, wherein the weak cationic exchange media of the second cartridge preferentially binds the lead radioisotope over radioisotopes of radium and thorium in the presence of the second loading solution comprising the weak acid having a pH in the range of from 1 to 5.5, and wherein the weak acid comprises any of carboxylate groups, sulfate groups, or phosphate groups.

13. The system of claim 1, wherein the weak cationic exchange media of the second cartridge elutes the lead radioisotope in the presence of the second eluent comprising a mineral acid in a concentration of 0.02-3 M.

14. The system of claim 1, wherein the weak cationic exchange media of the second cartridge comprises carboxyalkyl ionizable groups bound to a silica-based support.

15. The system of claim 1, wherein the strong cationic exchange media of the third cartridge preferentially binds radioisotopes of radium or thorium over the lead radioisotope in the presence of the third loading solution comprising mineral acid having a concentration of from 0.02 to 3 M.

16. The system of claim 1, wherein the strong cationic exchange media of the third cartridge comprises sulfonic acid groups.

17. The system of claim 1, wherein the lead-complexing media of the fourth cartridge preferentially binds lead radioisotope in the presence of the fourth loading solution comprising mineral acid in a concentration of from 0.02-3 M.

18. The system of claim 1, wherein the lead-complexing media of the fourth cartridge elutes the lead radioisotope in the presence of the fourth eluent comprising a weak acid and having a pH in the range of from 1 to 5.5, and wherein the weak acid comprises any of carboxylate groups, sulfate groups, or phosphate groups.

19. The system of claim 1, wherein the lead-complexing media of the fourth cartridge comprises a solid support impregnated with a solution comprising a crown-ether-complexing moiety.

20. The system of claim 19 wherein the crown-ether complexing moiety is a dicyclohexano-8-crown-6 or a dibenzo-18-crown-6 moiety wherein the cyclo-hexyl or benzyl groups are substituted by one or more straight-chain or branched $C_1$ to $C_{12}$ alkyl groups.

21. The system of claim 1, wherein the lead-complexing media of the fourth cartridge comprises a crown ether-complexing moiety selected from the group consisting of 4,4'(5')-di-t-butylcyclohexano 18-crown-6 diluted in isodecanol and 4,4'(5')-di-t-butylcyclohexano 18-crown-6 diluted in 1-octanol.

22. A system for separating a lead radioisotope from a mixture comprising lead radioisotope and a radium isotope or a thorium isotope, the system comprising a first, a second, a third and a fourth cartridge in series with one another, each of the four cartridges having an inlet, an outlet and a chamber therebetween containing chromatographic media, wherein
- (a) the first cartridge chamber contains a first chromatographic media comprising lead-complexing media that (i) preferentially binds the lead radioisotope over radioisotopes of radium and thorium in the presence of a first loading solution having a pH, $pH^{1L}$, the first loading solution comprising a mineral acid in a concentration of 1-3 M and the mixture, and (ii) elutes the lead radioisotope in the presence of a first eluent comprising a weak acid and having a pH, $pH^{1E}$, to form a first eluate comprising the lead radioisotope dissolved in the first eluate, wherein $pH^{1E}$ is greater than $pH^{1L}$,
- (b) the second cartridge chamber contains a second chromatographic media comprising a weak cationic exchange media, the weak cationic exchange media comprising carboxylic acid and/or carboxylate groups, that preferentially binds the lead isotope over radioisotopes of radium and thorium in the presence of a second loading solution comprising a weak acid, and having a pH, $pH^{2L}$, and elutes the lead radioisotope in the presence of a second eluent having a pH, $pH^{2E}$, and comprising a mineral acid in a concentration of 0.02-3M, wherein $pH^{2L}$ is greater than $pH^{2E}$;
- (c) the third cartridge contains a third chromatographic media comprising a strong cationic exchange media, the strong cationic exchange media comprising sulfonic acid and/or sulfonate groups, that preferentially binds radioisotopes of radium or thorium over the lead radioisotope in the presence of a third loading solution having a pH, $pH^{3L}$ and comprising a mineral acid in a concentration of 0.02-3 M, and
- (d) the fourth cartridge contains a first chromatographic media comprising lead-complexing media that preferentially binds the lead radioisotope over radioisotopes of radium and thorium in the presence of a fourth loading solution having a pH, $pH^{4L}$ and comprising a mineral acid in a concentration of 0.02-3 M and (ii) elutes the lead radioisotope in the presence of a fourth eluent comprising a weak acid and having a pH, $pH^{4E}$, wherein $pH^{4E}$ is greater than $pH^{4L}$, and
- (e) the outlet of the first cartridge is fluidly connected to the inlet of the second cartridge, such that the first eluate from the first cartridge flows directly into the second cartridge, and the outlet of the second cartridge is fluidly connected to the inlet of the third cartridge, such that the second eluate from the second cartridge flows directly into the third cartridge.

23. The system of claim 22 wherein the second cartridge chamber contains a second chromatographic media comprising carboxymethyl functional groups bound to a silica-based support.

24. The system of claim 23 wherein the third cartridge contains a third chromatographic media comprising sulfonic acid groups bound to divinyl benzene.

25. The system of claim 22 wherein the second cartridge chamber contains a second chromatographic media comprising carboxymethyl functional groups bound to a silica-based support and the third cartridge contains a third chromatographic media comprising sulfonic acid groups bound to divinyl benzene.

* * * * *